US009892449B2

United States Patent
Ishikawa et al.

(10) Patent No.: US 9,892,449 B2
(45) Date of Patent: Feb. 13, 2018

(54) INFORMATION PROVIDING SYSTEM, INFORMATION PROVIDING APPARATUS AND INFORMATION PROVIDING METHOD

(71) Applicant: YAHOO JAPAN CORPORATION, Tokyo (JP)

(72) Inventors: Taichi Ishikawa, Tokyo (JP); Takayuki Tsuchiya, Tokyo (JP); Hiroaki Mise, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 818 days.

(21) Appl. No.: 14/178,967

(22) Filed: Feb. 12, 2014

(65) Prior Publication Data
US 2014/0236760 A1 Aug. 21, 2014

(30) Foreign Application Priority Data
Feb. 15, 2013 (JP) .................................. 2013-028195

(51) Int. Cl.
*G06Q 30/02* (2012.01)
*G06Q 30/06* (2012.01)
(52) U.S. Cl.
CPC ................................ *G06Q 30/0633* (2013.01)
(58) Field of Classification Search
None
See application file for complete search history.

(56) References Cited

U.S. PATENT DOCUMENTS 6,587,835 B1 * 7/2003 Treyz ..................... G06Q 20/12
   705/14.64
2006/0163349 A1 * 7/2006 Neugebauer ......... G06Q 20/387
   235/383

(Continued)

FOREIGN PATENT DOCUMENTS

JP   A-2002-73774   3/2002
JP   2002-175459 A   6/2002

(Continued)

OTHER PUBLICATIONS

Definition—"Access Point" techterms.com updated Aug. 11, 2009.*

(Continued)

*Primary Examiner* — Neal Sereboff
(74) *Attorney, Agent, or Firm* — Oliff PLC

(57) ABSTRACT

An information providing apparatus according to an embodiment includes a terminal information acquiring unit, a store information acquiring unit, and a sending unit. The terminal information acquiring unit acquires information on purchase planned products which is sent from a wireless terminal existing in a store in which a wireless LAN communication apparatus is installed, from the wireless LAN communication apparatus. The store information acquiring unit acquires information on sales products corresponding to the information on the purchase planned products which is acquired by the terminal information acquiring unit, from a store information storage unit which stores pieces of information on the sales products in the store. The sending unit sends the information on the sales products which is acquired by the store information acquiring unit to the wireless terminal through the wireless LAN communication apparatus.

9 Claims, 13 Drawing Sheets

(56) References Cited

U.S. PATENT DOCUMENTS

| | | | | |
|---|---|---|---|---|
| 2008/0059323 A1* | 3/2008 | Chang | ............... | G06Q 30/02 |
| | | | | 705/26.8 |
| 2013/0041752 A1* | 2/2013 | Crum | ............... | G06Q 30/06 |
| | | | | 705/14.57 |
| 2014/0074649 A1* | 3/2014 | Patel | ............. | G06O 30/0631 |
| | | | | 705/26.7 |
| 2014/0095285 A1* | 4/2014 | Wadell | ............. | G06Q 30/00 |
| | | | | 705/14.25 |

FOREIGN PATENT DOCUMENTS

| | | |
|---|---|---|
| JP | A-2003-208574 | 7/2003 |
| JP | 2004343268 A | 12/2004 |
| JP | 2009252152 A | 10/2009 |
| JP | 2010-231622 A | 10/2010 |
| JP | 2012185571 A | 9/2012 |

OTHER PUBLICATIONS

Murphy, David "How to tell a bridge from an access point" PCWorld.COM Aug. 23, 2011.*
Pace University, "Network Troubleshooting and Resource Site for School IT Staff—Wireless Devices" webpage.pace.edu Sep. 17, 2011.*
Sep. 24, 2014 Office Action issued in Japanese Patent Application No. 2013-028195.
Feb. 24, 2015 Office Action issued in Japanese Application No. 2013-028195.

* cited by examiner

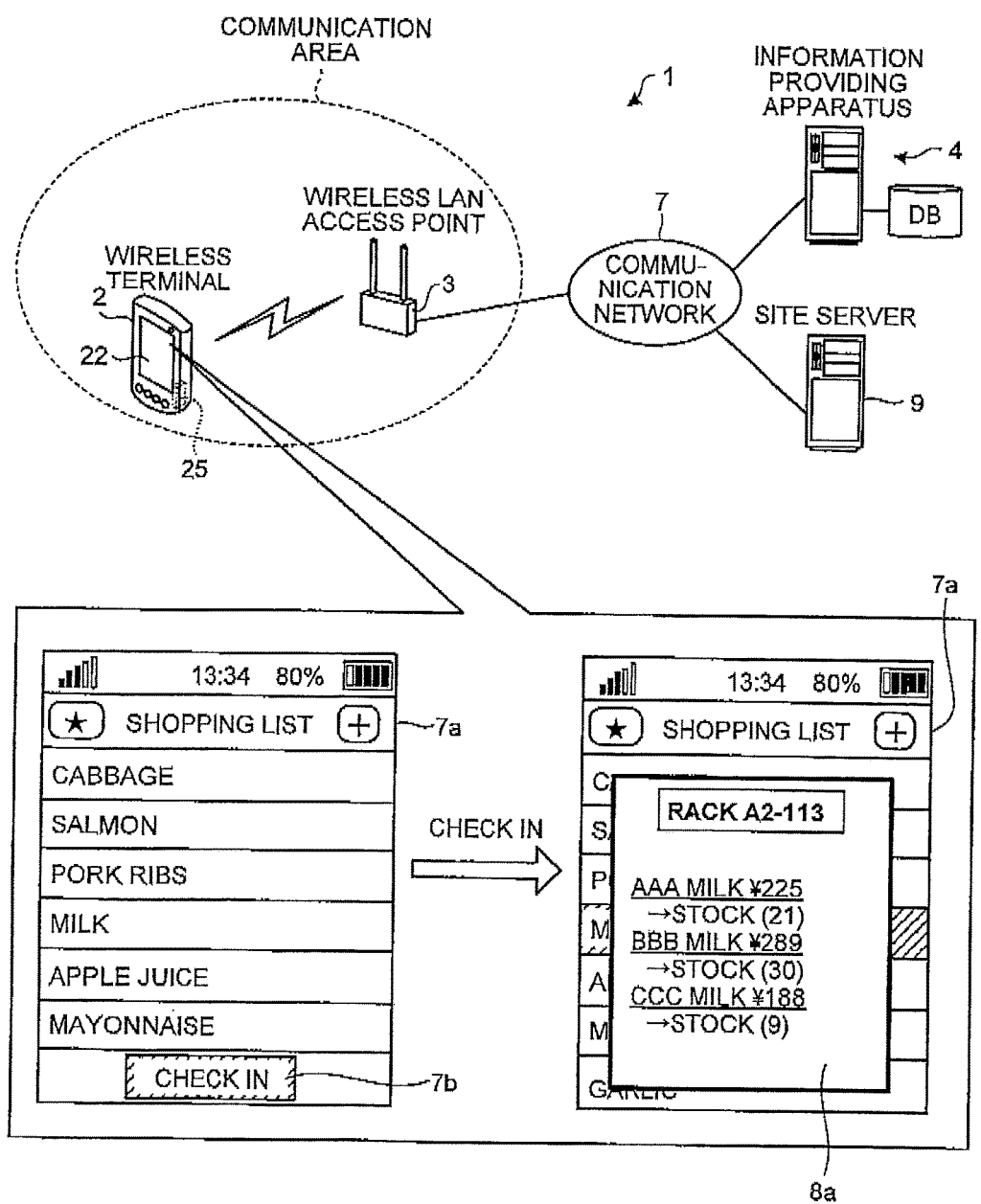

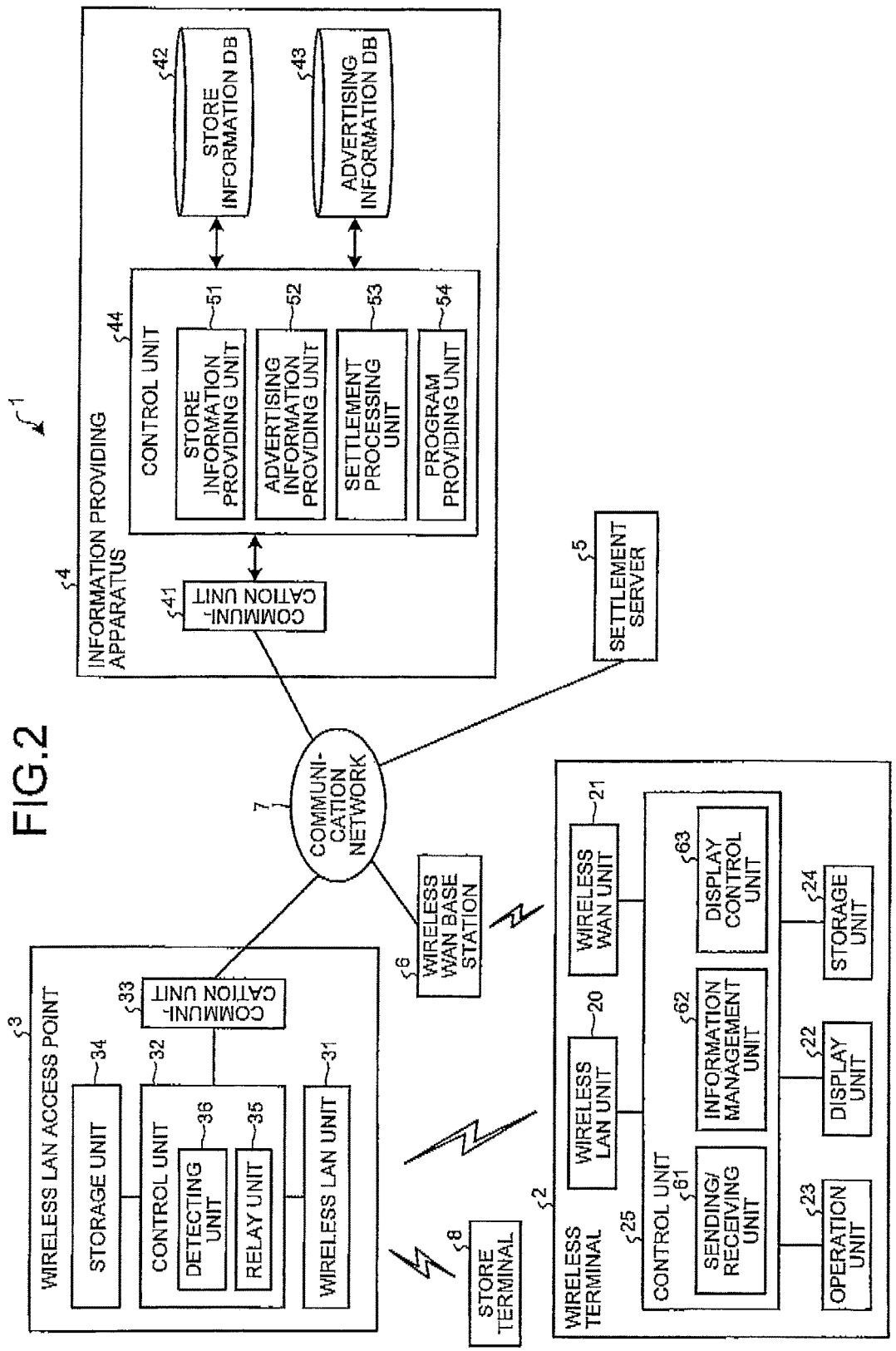

FIG.3

| RECIPE ID | RECIPE NAME | COOKING METHOD | INGREDIENT NAME | QUANTITY |
|---|---|---|---|---|
| C1 | RECOMMENDED PASTA DISH | COOKING METHOD A | CABBAGE | 1/3 |
| | | | PORK RIBS | 200 g |
| | | | BROCCOLI | 1/2 |
| | | | ⋮ | ⋮ |
| C2 | RECOMMENDED CURRY DISH | COOKING METHOD B | CURRY POWDER | ONE TABLESPOON |
| | | | ⋮ | ⋮ |
| ⋮ | ⋮ | ⋮ | ⋮ | ⋮ |

FIG.4

| INGREDIENT NAME | QUANTITY | RECIPE ID | PURCHASE PLANNED FLAG | SETTING DATE | SALES PRODUCT INFORMATION | PRODUCT ADVERTISING INFORMATION |
|---|---|---|---|---|---|---|
| CABBAGE | 1/3 | C1 | 1 | 12/30/2012 | Z00001.text | W00001.text |
| PORK RIBS | 200 g | C1 | 0 | 12/30/2012 | – | – |
| BROCCOLI | 1/2 | C1 | 1 | 12/30/2012 | Z00002.text | W00002.text |
| PASTA | 200 g | C1 | 0 | 12/30/2012 | – | – |
| ONION | ONE | C1 | 1 | 12/30/2012 | Z00003.text | W00003.text |
| MILK | 200 cc | C1 | 1 | 12/30/2012 | Z00004.text | W00004.text |
| ⋮ | ⋮ | ⋮ | ⋮ | ⋮ | ⋮ | ⋮ |

FIG.5

Z00004.text

STORE NAME: A STORE, PRODUCT NAME: MILK
AAA MILK, ¥255, ¥225, 21, RACK A2-113, MANUFACTURER M1,
PRODUCE OF JAPAN, http:/www.···
BBB MILK, ¥289, ¥289, 30, RACK A2-113, MANUFACTURER M2,
PRODUCE OF JAPAN, http:/www.···
CCC MILK, ¥188, ¥188, 9, RACK A2-113, MANUFACTURER M2,
PRODUCE OF JAPAN, http:/www.···

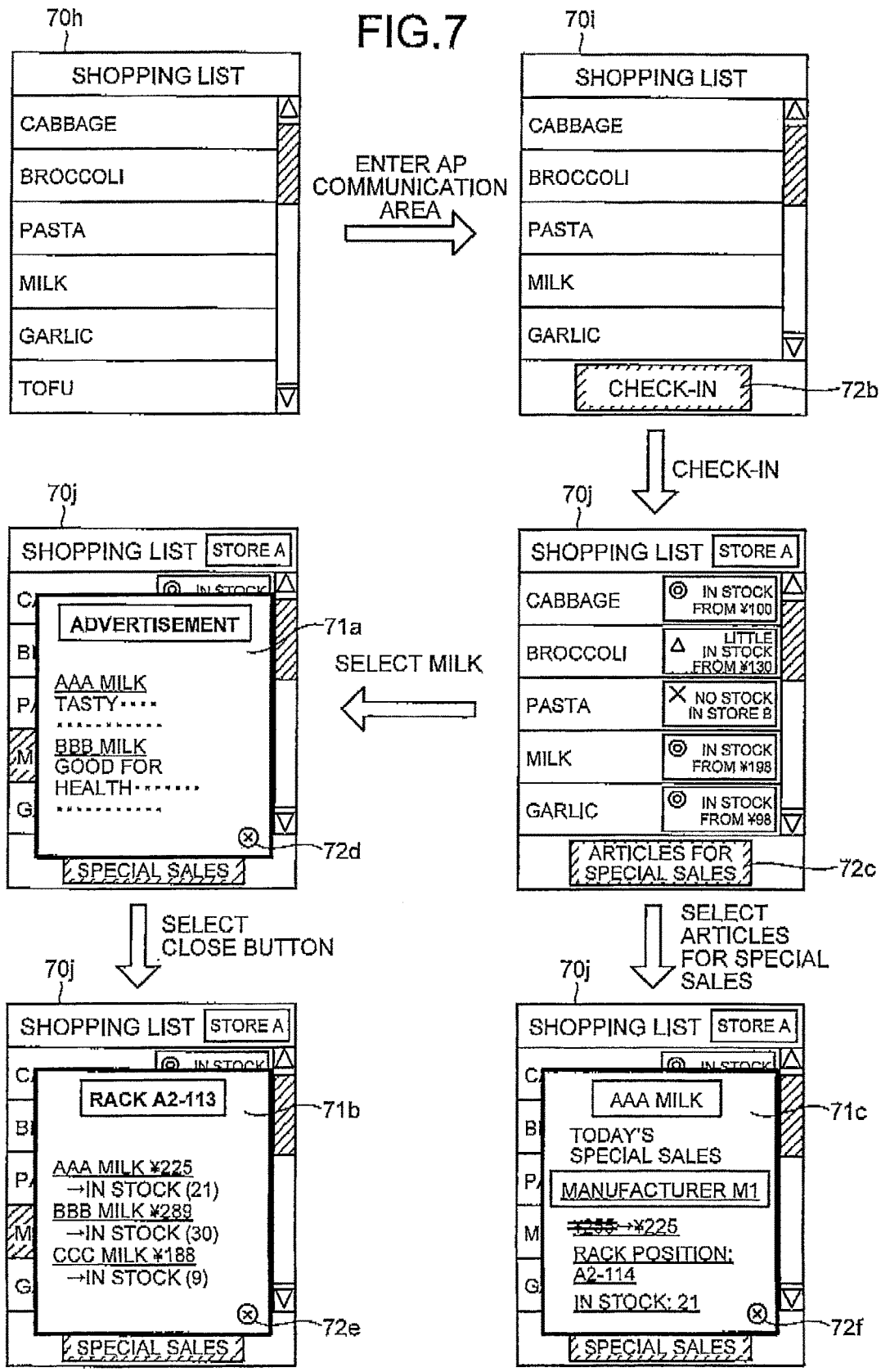

FIG.9

| STORE ID | AP-ID | STORE NAME | STORE LOCATION | PARTICIPATING STORE ID |
|---|---|---|---|---|
| R1 | P1 | STORE A | CHIYODA-KU, TOKYO, ⋯ | R2 |
| R2 | P2 | STORE B | CHIYODA-KU, TOKYO, ⋯ | R1 |
| ⋮ | ⋮ | ⋮ | ⋮ | ⋮ |

FIG.10

| STORE ID | TARGET PRODUCT | PRODUCT NAME | MANUFACTURER NAME | NORMAL PRICE | SELLING PRICE | STOCK STATE | RACK POSITION |
|---|---|---|---|---|---|---|---|
| R1 | MILK | AAA MILK | M1 | 255 | 225 | 21 | A2-111 |
| | | BBB MILK | M2 | 289 | 289 | 30 | A2-111 |
| | | CCC MILK | M2 | 188 | 188 | 9 | A2-111 |
| | PASTA | AAA PASTA | M11 | 110 | 98 | 0 | A3-052 |
| | | BBB PASTA | M12 | 220 | 220 | 0 | A3-052 |
| | ⋮ | ⋮ | ⋮ | ⋮ | ⋮ | ⋮ | ⋮ |
| R2 | PASTA | CCC PASTA | M11 | 120 | 98 | 21 | B4 |
| | | AAA PASTA | M11 | 110 | 88 | 43 | B4 |
| | | BBB PASTA | M12 | 220 | 220 | 6 | B4 |
| | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |

| STORE ID | TERMINAL ID | POINTS | STAYING TIME | RADIO FIELD INTENSITY |
|---|---|---|---|---|
| R1 | U1 | 210 | 0 | 0 |
|  | U2 | 50 | TWO MINS | 2 |
|  | U3 | 3170 | 0 | 0 |
|  | U4 | 390 | 15 MINS | 8 |
|  | ⋮ | ⋮ | ⋮ | ⋮ |
| R2 | U3 | 230 | 10 SECS | 3 |
|  | U28 | 0 | THREE MINS | 7 |
|  | ⋮ | ⋮ | ⋮ | ⋮ |
| ⋮ | ⋮ | ⋮ | ⋮ | ⋮ |

INFORMATION PROVIDING SYSTEM, INFORMATION PROVIDING APPARATUS AND INFORMATION PROVIDING METHOD

CROSS-REFERENCE TO RELATED APPLICATIONS

The present application claims priority to and incorporates by reference the entire contents of Japanese Patent Application No. 2013-028195 filed in Japan on Feb. 15, 2013.

BACKGROUND OF THE INVENTION

1. Field of the Invention

The present invention relates to an information providing system, an information providing apparatus, and an information providing method.

2. Description of the Related Art

Conventionally, before going out shopping, generally, a shopping list is made on a piece of paper describing ingredients necessary for a cooking recipe, and taken for shopping. Recently, there has been proposed a technique for setting the shopping list in a portable terminal.

For example, Japanese Laid-open Patent Publication No. 2002-073774 proposes a technique for sending a list of ingredients to the portable terminal through an email. In the list, written information includes ingredient information including quantity information items of all ingredients necessary for menus in a predetermined period of time. Japanese Laid-open Patent Publication No. 2003-208574 proposes a technique for creating a shopping memo in a portable terminal. Specifically, ingredients of a cooking recipe are stored in a storage unit, and a desired item to be purchased is selected from the ingredients of the cooking recipe stored in the storage unit.

However, in the above-described techniques, the ingredient list or shopping list (shopping-memo) is only displayed on a display unit of the portable terminal. Thus, a user of the portable terminal has to shop while searching for those products in a store, in accordance with the shopping list displayed on the display unit.

That is, the sales conditions of the products set in the shopping list can be known only by glancing at an advertisement flier or by actually entering and visiting the store. Therefore, it cannot be said that the user of the portable terminal can comfortably shop.

SUMMARY OF THE INVENTION

According to an exemplary embodiment, an information providing system includes a wireless terminal, a wireless LAN communication apparatus, and an information providing apparatus. The wireless terminal includes a storage unit, a sending unit, a receiving unit, and a display unit. The storage unit stores a shopping list including information on purchase planned products. The sending unit sends the information on the purchase planned products included in the shopping list. The receiving unit receives information on sales products corresponding to the purchase planned products. The display unit displays the information on the sales products which is received by the receiving unit. The wireless LAN communication apparatus includes a detecting unit and a transfer unit. The detecting unit detects a wireless terminal existing in a store in which the wireless LAN communication apparatus is installed. The transfer unit transfers the information on the purchase planned products which is sent from the wireless terminal detected by the detecting unit to the information providing apparatus, and acquires the information on the sales products corresponding to the purchase planned products from the information providing apparatus to transfer the acquired information to the wireless terminal. The information providing apparatus includes a terminal information acquiring unit, a store information acquiring unit, and a sending unit. The terminal information acquiring unit acquires the information on the purchase planned products, which is sent from the wireless terminal existing in the store, from the wireless LAN communication apparatus. The store information acquiring unit acquires, from among pieces of information on the sales products in the store, the information on the sales products corresponding to the information on the purchase planned products which is acquired by the terminal information acquiring unit. The sending unit sends the information on the sales products acquired by the store information acquiring unit to the wireless LAN communication apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is an explanatory diagram of an information providing process which is performed by an information providing system according to an embodiment;

FIG. 2 is a diagram illustrating a configuration example of the information providing system according to the embodiment;

FIG. 3 is a diagram illustrating an example of a recipe information table;

FIG. 4 is a diagram illustrating an example of a shopping list information table;

FIG. 5 is a diagram illustrating an example of sales product information;

FIG. 7 is a diagram illustrating an example of screen transitions of a shopping application;

FIG. 9 is a diagram illustrating an example of a store information table;

FIG. 10 is a diagram illustrating an example of a sales product information table;

DETAILED DESCRIPTION OF THE PREFERRED EMBODIMENT

Figure 6:
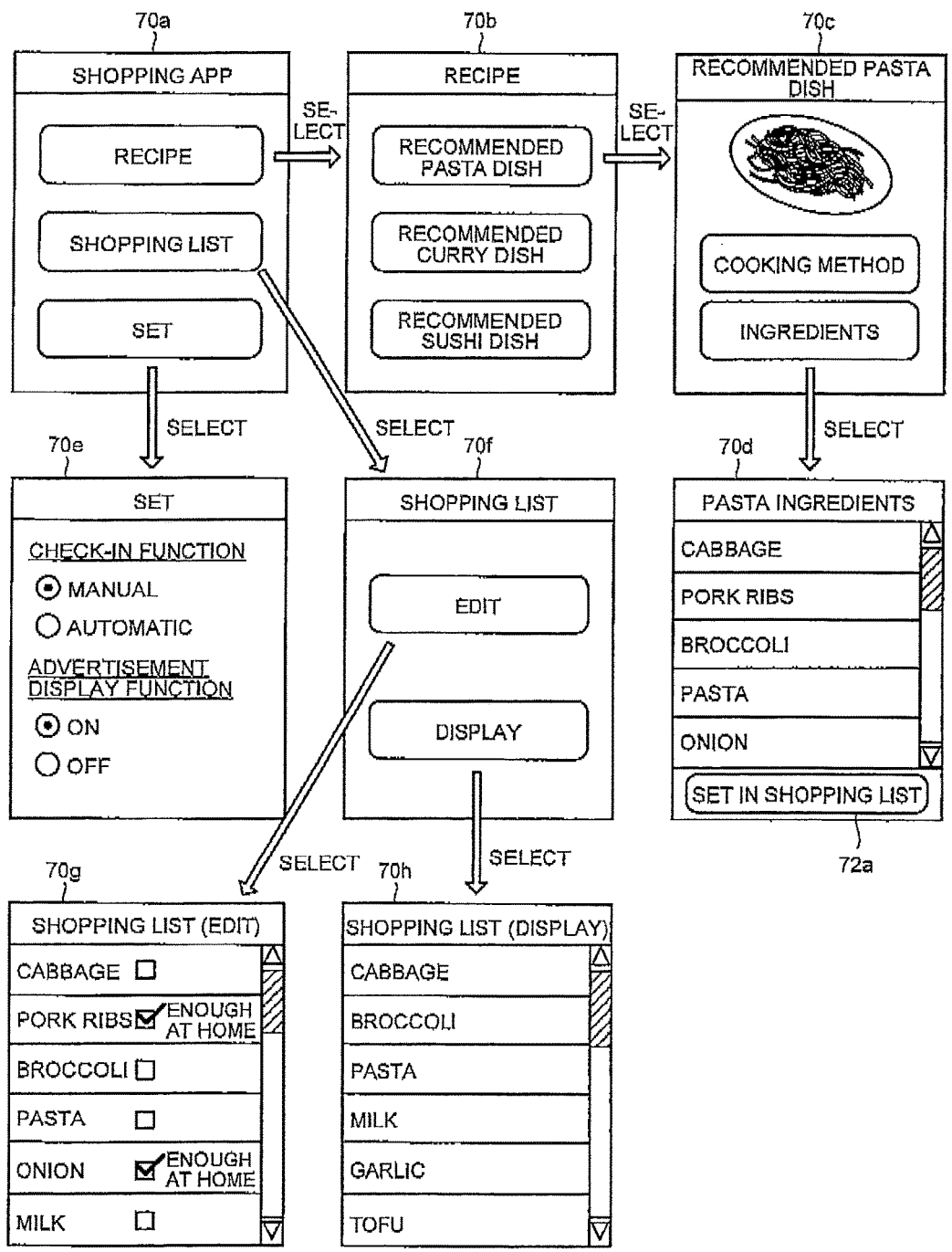
FIG. 6 is a diagram illustrating an example of screen transitions of a shopping application.

Descriptions will now be made to an information providing system, an information providing apparatus, and an information providing method, according to the present application. This embodiment is not to limit the information providing system, the information providing apparatus, and the information providing method, according to the present application. A database will hereinafter be referred to as a DB.

1. Information Providing Process

Descriptions will now be made to an information providing process according to an embodiment. FIG. 1 is an explanatory diagram of the information providing process performed by an information providing system according to the embodiment.

As illustrated in FIG. 1, an information providing system 1 according to the embodiment includes a wireless terminal 2, a wireless LAN (Local Area Network) access point 3, and an information providing apparatus 4. The information providing apparatus 4 can communicate with the wireless LAN access point 3 through a communication network 7, such as the Internet.

The wireless terminal 2 is a cellular phone in which, for example, a wireless LAN communication function is installed, and can access the information providing apparatus 4 or a site server 9 through the wireless LAN access point 3 in a communication area of the wireless LAN access point 3. The wireless terminal 2 can access the information providing apparatus 4 or the site server 9 connected to the communication network 7 through a wireless WAN base station (not illustrated), such as the cellular phone base station. The site server 9 is a server which provides, for example, web pages to the wireless terminal 2.

In the wireless terminal 2, a shopping program (hereinafter referred to as a shopping application) is installed as an application. Program data of this shopping application is provided, for example, from the information providing apparatus 4. A user of the wireless terminal 2 (hereinafter, may be referred to as a terminal user) operates, for example, the wireless terminal 2, to access the information providing apparatus 4 connected to the communication network 7 through the wireless WAN base station and to acquire program data of the shopping application from the information providing apparatus 4. A control unit 25 of the wireless terminal 2 installs the shopping application by expanding the acquired program data into an internal storage unit.

The control unit 25 of the wireless terminal 2 displays a shopping list screen 7a on a display unit 22, using a function of the shopping application. In this shopping list screen 7a, a shopping list is set. This shopping list includes information on a product(s) (hereinafter, referred to as a purchase planned product) that the user of the wireless terminal 2 plans to purchase. In the example of the shopping list screen 7a illustrated in FIG. 1, the purchase planned products are "cabbage", "salmon", "pork ribs", "milk", "apple juice", and "mayonnaise", as shown in the shopping list.

When the wireless terminal 2 enters the communication area of the wireless LAN access point 3, session is established with the wireless LAN access point 3, and it moved into a communication state. When it is in the communication state with the wireless LAN access point 3, the control unit 25 of the wireless terminal 2 sets a check-in button 7b in the shopping list screen 7a.

The display unit 22 is a touch panel display. The user of the wireless terminal 2 selects the check-in button 7b on the screen of the display unit 22, by operating it with the user's finger. When the check-in button 7b is selected, the control unit 25 of the wireless terminal 2 sends a check-in request addressed to the information providing apparatus 4, to the wireless LAN access point 3.

Upon reception of the check-in request from the wireless terminal 2, the wireless LAN access point 3 transfers this check-in request to the information providing apparatus 4 through the communication network 7. Upon reception of the check-in request, the information providing apparatus 4 acquires information on products to be sold (hereinafter, referred to as sales products) in an installation store (hereinafter, referred to as an AP installation store) in which the wireless LAN access point 3 is installed, from a DB on the basis of information included in the check-in request.

The check-in request includes information on the purchase planned products included in the shopping list. The information providing apparatus 4 acquires information on the sales products corresponding to the purchase planned products. When the shopping list screen 7a of the wireless terminal 2 is in a state illustrated in FIG. 1, the information providing apparatus 4 acquires prices, stock states, display positions (hereinafter referred to as a rack position), and also manufacturer information of respective "cabbage", "salmon", "pork ribs", and "milk" sold in the AP installation store, from the DB.

Upon acquisition of the information (hereinafter may be referred to as sales product information) regarding the sales products corresponding to the purchase planned products, the information providing apparatus 4 sends the sales product information addressed to the wireless terminal 2 to the wireless LAN access point 3. Upon reception of sales product information from the information providing apparatus 4, the wireless LAN access point 3 sends this sales product information to the wireless terminal 2.

Upon acquisition of the sales product information from the information providing apparatus 4 through the wireless LAN access point 3, the control unit 25 of the wireless terminal 2 stores the information in the internal storage unit. After this, if the user of the wireless terminal 2 selects, for example, "milk" displayed in the shopping list screen 7a, the control unit 25 of the wireless terminal 2 reads the sales product information corresponding to "milk" from the internal storage unit, and displays a store information screen 8a on the shopping list screen 7a in an overlapped state thereon on the display unit 22. This overlapped display is only one example, and the store information screen 8a may be displayed on a different page from the shopping list screen 7a.

In the store information screen 8a illustrated in FIG. 1, sales product information corresponding to "milk" is set. Specifically, information is set in the store information screen 8a, and this information represents product names (AAA milk, BBB milk, CCC milk), selling prices, and quantity of stock, in association with "milk" sold in the AP installation store.

For example, in the set information, the selling price of the product name "AAA milk" is "225 yen", the number of stock is "21", and the product is displayed on a rack A2-113. On the store information screen 8a, if the terminal user selects a product name "AAA milk", a specific information screen (not illustrated) is displayed on the display unit 22. This specific information screen includes specific information regarding the place of production, nutritional information, calorie, and sales conditions, in addition to the product name, the selling price, and the stock condition. The specific information is included in information on the purchase planned products sent from the information providing apparatus 4.

Accordingly, in the information providing process according to the embodiment, information on the products to be sold in the AP installation store is displayed on the display unit 22 of the wireless terminal 2, in accordance with the set condition of the shopping list. Thus, by setting purchase planned products in the shopping list, the user of the wireless terminal 2 who has entered the AP installation store can easily understand information on a desired product included in those products sold in the AP installation store, and thus can comfortably shop in the AP installation store. The AP installation store can appeal a product that the store wishes to sell to those customers in the actual store in real time, and can increase the sales.

Of sales products in the AP installation store, the information providing apparatus 4 can regard information (including a coupon) about a particular product of a recommended manufacturer, of the sales products in the AP installation store, as sales product information. Then, the terminal user can comfortably shop, thus remarkably improving the attractiveness of the AP installation store.

The descriptions will be made below to the specific configuration and specific process of the information providing system 1 which executes the above-described information providing process, with reference to the drawings.

2. Information Providing System

Descriptions will now be made to a configuration example of the information providing system 1 according to the embodiment, with reference to FIG. 2. FIG. 2 is a diagram illustrating the configuration example of the information providing system 1 according to the embodiment.

As illustrated in FIG. 2, the information providing system 1 has the wireless terminal 2, the wireless LAN access point 3, the information providing apparatus 4, and a settlement server 5. The information providing apparatus 4 can communicate with the wireless LAN access point 3 through the communication network 7. The communication network 7 is an IP (Internet Protocol) network, for example, the Internet.

The wireless terminal 2 is a cellular phone (for example, a smartphone) having a wireless LAN communication function, and can communicate with the wireless LAN access point 3 or a wireless WAN (Wide Area Network) base station 6. In the example illustrated in FIG. 2, only one wireless terminal 2 is illustrated. However, this wireless terminal 2 is owned by each of users.

The wireless LAN access point 3 is provided in and corresponds to each store (hereinafter may be referred to as a service participating store) that participates in an information providing service provided by the information providing system 1. In the example illustrated in FIG. 2, for the sake of convenience, only one wireless LAN access point 3 is illustrated. However, the wireless LAN access point 3 is installed in each service participating store. This wireless LAN access point 3 has a communication area inside the store of the service participating store. When the area of the service participating store is large, it is possible to install a plurality of wireless LAN access points 3 in one service participating store.

The wireless LAN access point 3 is managed by the store manager, for example. The information providing apparatus 4 is managed by an information providing service agent, for example. The settlement server 5 is managed by a financial agency. The wireless LAN access point 3 may also be managed by the information providing service agent.

Descriptions will now be made sequentially to specific configurations of the Wireless terminal 2, the wireless LAN access point 3, and the information providing apparatus 4.

2.1. Wireless Terminal 2

As illustrated in FIG. 2, the wireless terminal 2 has a wireless LAN unit 20, a wireless WAN unit 21, the display unit 22, an operation unit 23, a storage unit 24, and the control unit 25. The wireless LAN unit 20 sends and receives information to and from the wireless LAN access point 3.

The wireless WAN unit 21 sends and receives information to and from the wireless WAN base station 6. The wireless WAN base station 6 is, for example, a wireless base station of a public telephone communication network or a wireless base station of a public data communication network.

The display unit 22 is a touch panel display. The user of the wireless terminal 2 operates the screen of the display unit 22 by the user's finger, thereby enabling to operate the screen of the shopping application displayed on the display unit 22. This display unit 22 is a small-sized LCD (Liquid Crystal Display) or an organic EL display.

The operation unit 23 has a keyboard and a power button. The key board includes keys for inputting letters, numerals, and spaces, an enter key, and arrow keys.

The storage unit 24 is a semiconductor memory device, such as a RAM (Random Access Memory), a flash memory (Flash Memory) or a storage device, such as a hard disk or an optical disk. This storage unit 24 stores various programs or set data. Those programs stored in the storage unit 24 are programs for, for example, an OS (Operating System) or a shopping application acquired from the information providing apparatus 4.

The control unit 25 is realized by an integrated circuit, such as an ASIC (Application Specific Integrated Circuit) or an FPGA (Field Programmable Gate Array). The control unit 25 realizes or executes functions or actions of an information process (described later) upon execution of the programs stored in the storage unit 24 using a non-illustrative internal RAM as a working area, under the control of the CPU (Central Processing Unit) or MPU (Micro Processing Unit).

Functions of Shopping Application

The control unit 25 executes the shopping application whose program data is stored in the storage unit 24, thereby realizing functions as a sending/receiving unit 61, an information management unit 62, and a display control unit 63. The control unit 25 executes the shopping application whose program data is stored in the storage unit 24, thereby storing information including set data, screen data, and recipe data of the shopping application, in the storage unit 24. The configuration of the control unit 25 is not limited to this configuration, and may be any other configuration, as long as an information process to be described later is performed.

The set data of the shopping application includes information regarding check-in operation setting and advertisement display setting, in addition to a unique and non-duplicated ID (hereinafter referred to as a terminal ID) for each wireless terminal 2. The default setting of the check-in operation is "manual", and the default setting of the advertisement display setting is "ON". The terminal ID is a MAC address of, for example, the wireless LAN unit 20 of the wireless terminal 2.

The recipe data includes information (hereinafter referred to as cooking information) for explaining the cooking method of each recipe and information (hereinafter referred to as ingredient information) regarding ingredients for cooking. These information pieces are set in a recipe information table. FIG. 3 is a diagram illustrating an example of the recipe information table. As illustrated in FIG. 3, the recipe information table has information items including "recipe ID", "recipe name", "cooking method", "ingredient name", and "quantity", in association with each other.

The information item "recipe ID" is a unique information item assigned to each recipe. The information item "recipe name" represents a name of a recipe, and may, for example, be "recommended pasta dish" or "recommended curry dish". The information item "cooking method" is information for explaining a cooking method of each recipe.

The information item "ingredient name" represents ingredients for each recipe. For example, in the case of "recommenced pasta dish", the ingredients may be "cabbage", "pork ribs", and "broccoli". The information item "quantity" represents the quantity of each ingredient used in each recipe, and may be "⅓" of "cabbage".

Sending/Receiving Unit 61

The sending/receiving unit 61 sends and receives information to and from the information providing apparatus 4 through the wireless LAN unit 20. For example, the sending/receiving unit 61 sends a check-in request to the information providing apparatus 4, on the basis of an operation on the operation unit 23 by the terminal user, and receives sales product information sent from the information providing apparatus 4 through the wireless LAN unit 20.

Information Management Unit 62

The information management unit 62 stores information input by the terminal user by operating the display unit 22 or the operation unit 23 or information acquired by the sending/receiving unit 61, in the storage unit 24. The information management unit 62 reads the information stored in the storage unit 24, on the basis of an operation on the operation unit 23 by the terminal user.

For example, when the terminal user performs a check-in operation by operating the operation unit 23, the information management unit 62 acquires information on a purchase planned product(s) included in the shopping list table from the storage unit 24, and outputs a check-in request including the information on the purchase planned product to the sending/receiving unit 61.

The shopping list table is set as illustrated in FIG. 4, for example. FIG. 4 is a diagram illustrating an example of the shopping list table. The shopping list table illustrated in FIG. 4 has information items "ingredient", "quantity", "recipe ID", "purchase planned flag", "setting date", "sales product information", and "product advertising information", in association with each other. The information items "ingredient name", "quantity", and "recipe ID" are set on the basis of information on the recipe information table.

The item "purchase planned flag" is a flag representing whether a corresponding product is a product that the terminal user plans to purchase. "1" is set when the product is a purchase planned product, while "0" is set when the product is not a purchase planned product. The "setting date" is information regarding the date on which a corresponding "ingredient name" is set in the shopping list table, and is set by the information management unit 62. The information management unit 62 can set information regarding the date and time of the setting instead of the setting date in the shopping list table.

The "sales product information" and the "product advertising information" are information items that correspond to the purchase planned products and are sent from the information providing apparatus 4 to the wireless terminal 2 through the wireless LAN access point 3. Their file names are set in the shopping list table by the information management unit 62.

The information management unit 62 sets information including, for example, "ingredient name", "quantity", "recipe ID" and "setting date", in the check-in request, as information on the purchase planned products from the shopping list table. The terminal user can select information to be included in the check-in request. For example, the terminal user may set only "ingredient name" in the check-in request.

FIG. 5 is a diagram illustrating an example of sales product information. This sales product information is information on a file name "Z00004.text" corresponding to a purchase planned product "milk" illustrated in FIG. 4. In the example of FIG. 5, information items (addresses of pages introducing product name, normal price, selling price, quantity of stock, rack position, manufacturer name, place of production, and product) of three kinds of sales products are included, in association with the purchase planned product "milk". For example, those sales products whose "selling price" is lower than "normal price" are articles for special sales. The sales product information includes coupon information (a coupon image) of sales products, and thus coupons can be displayed on the display unit 22 of the wireless terminal 2.

The product advertising information is advertising information which is searched by the information providing apparatus 4, using the purchase planned product as a search keyword. For example, for the purchase planned product "milk", the information providing apparatus 4 searches product advertising information including advertising information of AAA milk, advertising information of BBB milk, and advertising information of CCC milk.

Display Control Unit 63

The display control unit 63 controls a screen displayed on the display unit 22. Descriptions will now be made to an example of a process of the display control unit 63, with reference to FIG. 6 and FIG. 7. FIG. 6 and FIG. 7 are diagrams each illustrating an example of screen transitions of the shopping application.

The screen illustrated in FIG. 6 transits in accordance with an operation of the terminal user, regardless of whether the wireless terminal 2 is now communicating with the wireless LAN access point 3. The user selection of setting is performed by the terminal user who operates the display unit 22 or the operation unit 23.

When the terminal user activates the shopping application at the wireless terminal 2, the display control unit 63 reads information on a main selection screen 70a illustrated in FIG. 6 from the storage unit 24, and displays it on the display unit 22. Information items to be selected on the main selection screen 70a are "recipe", "shopping list", and "set".

About Recipe

On the main selection screen 70a, if the terminal user selects, for example, "recipe", the display control unit 63 reads a recipe information table from the storage unit 24, generates a recipe selection screen 70b illustrated in FIG. 6 on the basis of the recipe information table, and displays it on the display unit 22. Information items to be selected on the recipe selection screen 70b are "recommended pasta dish", "recommended curry dish", and "recommended Sushi dish". These information items are only examples, and any other recipes may be selected.

On the recipe selection screen 70b, when the terminal user selects "recommended pasta dish", the display control unit 63 reads the recipe information table from the storage unit 24, generates a recipe content selection screen 70c illustrated in FIG. 6 on the basis of the recipe information table, and displays it on the display unit 22. Information items to be selected on this recipe content selection screen 70c are "cooking method" and "ingredient".

On the recipe content selection screen 70c, when the terminal user selects, for example, "cooking method", the display control unit 63 reads information on the cooking method corresponding to "recommended pasta dish" from the recipe information table of the storage unit 24, and displays it on the display unit 22. On the contrary, when the terminal user selects "ingredient", the display control unit 63 reads ingredient information for "recommended pasta dish" from the recipe information table of the storage unit 24, generates an ingredient list screen 70*d* illustrated in FIG. 6 on the basis of the ingredient information, and displays it on the display unit 22.

On the ingredient list screen 70*d*, a set button 72*a* is arranged. When the terminal user selects the set button 72*a*, the information management unit 62 sets ingredient information of "recommended pasta dish" in the shopping list table of the storage unit 24.

Accordingly, the control unit 25 can set ingredient information of the recipe that the terminal user wants, in the shopping list. The descriptions have been made to a case where recipe information is included as a recipe information table in the program data of the shopping application. However, the recipe information may be acquired by the sending/receiving unit 61 from the information providing apparatus 4 in accordance with an operation on the operation unit 23 by the terminal user. In this manner, the latest recipe can be acquired.

About Setting

On the main selection screen 70*a*, when the terminal user selects, for example, "set", the display control unit 63 reads a setting selection screen 70*e* illustrated in FIG. 6 from the storage unit 24, and displays it on the display unit 22. Those functions to be selected on this setting selection screen 70*e* are a check-in function and an advertisement display function.

The check-in function is both "manual" and "automatic". When the terminal user checks a corresponding checkbox, corresponding information is set in the set data by the information management unit 62. This enables to switch between the manual check-in and the automatic check-in.

The advertisement display function has both "ON" and "OFF". When the terminal user checks a corresponding checkbox, corresponding information is set in the set data by the information management unit 62. This enables to switch between "ON" and "OFF" of the advertisement display function.

Shopping List

On the main selection screen 70*a*, when the terminal user selects, for example, "shopping list", the display control unit 63 reads a shopping list selection screen 70*f* illustrated in FIG. 6 from the storage unit 24, and displays it on the display unit 22. Information items to be selected on this shopping list selection screen 70*f* are "edit" and "display".

On the shopping list selection screen 70*f*, if the terminal user selects "edit", the display control unit 63 reads information about an ingredient name and a purchase planned flag, included in the shopping list table, from the storage unit 24, generates a shopping list editing screen 70*g*, and displays it on the display unit 22.

On the shopping list editing screen 70*g* illustrated in FIG. 6, set ingredient names are "cabbage", "pork ribs", "broccoli", "pasta", "onion", and "milk". Checkboxes are arranged in association with the ingredient names. When a purchase planned flag corresponding to each ingredient is "0", the checkbox is checked. When a purchase planned flag is "1", the checkbox is not checked.

If the terminal user checks the checkbox, the information management unit 62 sets the purchase planned flag in the shopping list table corresponding to the checkbox, to "0". When the checkbox is unchecked, the purchase planned flag is set to "1". Any of those ingredients corresponding to the purchase planned flag with "1" is a purchase planned product.

Accordingly, even after the control unit 25 sets the ingredient information in the shopping list, the terminal user can exclude any of those ingredients that are not necessarily purchased due to enough stock at home, from a list of purchase planned products.

On the shopping list selection screen 70*f*, when the terminal user selects "display", the display control unit 63 reads purchase planned product information from the shopping list table, from the storage unit 24, generates a shopping list display screen 70*h*, and displays it on the display unit 22. The purchase planned product information is ingredient information in which the stock flag is "1", of the ingredient information included in the shopping list.

On the shopping list display screen 70*h*, the terminal user can display a list of information on ingredients that are necessarily purchased for the desired recipe. In a state where the shopping list display screen 70*h* is displayed, when the user of the wireless terminal 2 enters a communication area of the wireless LAN access point 3 (hereinafter referred to as an AP communication area), the sending/receiving unit 61 establishes communication session with the wireless LAN access point 3.

When the communication session has been established, the display control unit 63 reads information on a shopping list display screen 70*i* illustrated in FIG. 7 from the storage unit 24, and displays it on the display unit 22, if a check-in function is set in the manual check-in. On the shopping list display screen 70*i*, a check-in button 72*b* is arranged; If the terminal user selects the check-in button 72*b*, the sending/receiving unit 61 sends a check-in request addressed to the information providing apparatus 4 from the wireless LAN unit 20 to the wireless LAN access point 3.

The check-in request includes a terminal ID of the wireless terminal 2 or purchase planned product information. The terminal ID or purchase planned product information is read by the sending/receiving unit 61 from the storage unit 24, and is set in the check-in request. Unique identification information affixed by the shopping application may be recognized as a terminal ID, and the check-in request may include a terminal ID and a MAC address of the wireless LAN unit 20.

When the check-in function is set in the automatic check-in, after the communication session is established, the sending/receiving unit 62 sends a check-in request addressed to the information providing apparatus 4 to the wireless LAN access point 3, without transitioning to the shopping list display screen 70*i* on which the check-in button 72*b* is arranged, as illustrated in FIG. 7. When the automatic check-in is set, if the shopping application is activated on the wireless terminal 2, the sending/receiving unit 61 sends a check-in request, even in a state where the shopping list display screen 70*h* is not displayed on the display unit 22.

In any of the manual check-in and automatic check-in, all the purchase planned product information items set in the shopping list are set in the check-in request. However, the sending/receiving unit 61 can also set only a part of the purchase planned product information items in the check-in request. For example, the sending/receiving unit 61 sets only the purchase planned product information item(s) displayed on the display unit 22 in the check-in request, and can also send an additional check-in request including a new purchase planned product information item, at a timing that the new purchase planned product information is displayed on the display unit 22.

In response to the check-in request, the sending/receiving unit 61 receives sales product information sent from the information providing apparatus 4 to the wireless LAN unit 20 through the wireless LAN access point 3, and sets it in the shopping list table stored in the storage unit 24. In the shopping list table illustrated in FIG. 4, as described above, data of a file name "Z00004.text" (see FIG. 5) is set as sales product information corresponding to the purchase planned product whose ingredient name is, for example, "milk".

If the sales product information is set in the shopping list table, the display control unit 63 reads the sales product information from the storage unit 24, generates a shopping list display screen 70*j*, and displays it on the display unit 22. On the shopping list display screen 70*j*, information on products sold in the AP installation store is arranged, in association with the purchase planned product information. For example, the stock state "in stock" is set as a stock state of the product "cabbage" sold in the AP installation store, and the price of "100 yen or higher" is set, in association with the purchase planned product "cabbage".

Accordingly, the wireless terminal 2 displays the sales product information corresponding to the purchase planned product, on the display unit 22. Thus, the terminal user checks in the AP installation store, thereby very easily understanding whether this store has a desired product and its price. In the example illustrated in FIG. 7, the stock state and the price information are displayed. However, any other purchase planned product information may be displayed in accordance with user selection.

As illustrated in FIG. 5, the sales product information sent from the information providing apparatus 4 includes a name of the AP installation store, and the shopping list display screen 70*j* displays the store name. Thus, even if the wireless terminal 2 automatically acquires, for example, the sales product information upon automatic check-in, the terminal user can easily understand to which store the sales product information corresponds.

On the shopping list display screen 70*j*, if the terminal user selects "milk", the display control unit 63 reads product advertising information corresponding to the ingredient name "milk" from the shopping list table stored in the storage unit 24. When the shopping list table is in a state illustrated in FIG. 4, the sending/receiving unit 61 reads data of the file name "W00004.text" from the storage unit 24, as product advertising information corresponding to the ingredient name "milk", generates a product advertising information screen 71*a*, and displays it on the display unit 22.

As illustrated in FIG. 7, the product advertising information screen 71*a* is a pop-up screen which is overlapped and displayed on the shopping list display screen 70*j*, and has advertising information "AAA milk" and advertising information "BBB milk" as product advertising information. The layout of the product advertising information screen 71*a* is illustrated only by way of example, and can be changed on the basis of, for example, the setting of the terminal user.

A close button 72*d* is arranged on the product advertising information screen 71*a*. The terminal user selects the close button 72*d*, thereby closing the product advertising information screen 71*a*. Upon selection of the close button 72*d*, the display control unit 63 generates a sales product information screen 71*b* in place of the product advertising information screen 71*a*, and displays it on the display unit 22.

Specifically, the display control unit 63 acquires sales product information corresponding to the ingredient name "milk" selected by the terminal user on the shopping list display screen 70*j*, from the shopping list table. When the shopping list table is in a state illustrated in FIG. 4, the sending/receiving unit 61 reads data of a file name "Z00004.text" from the storage unit 24, as sales product information corresponding to the ingredient name "milk", generates the sales product information screen 71*b*, and displays it on the display unit 22.

As illustrated in FIG. 7, the sales product information screen 71*b* is a pop-up screen which is overlapped and displayed on the shopping list display screen 70*j*, and has information including the product name, the price, the quantity of stock, and the rack position, in association with three kinds of "milk", as sales product information. The layout of the sales product information screen 71*b* is illustrated only by way of example, and can be changed on the basis of, for example, the setting of the terminal user. For example, the screen can display specific information, such as the place of production, nutritional information, calorie, and sales conditions, in association with the sales product. A close button 72*e* is arranged also on the sales product information screen 71*b*. The terminal user can select the close button 72*e*, thereby enabling to close the sales product information screen 71*b*.

The product name has an address (embedded therein) of a page (hereinafter referred to as a product introduction page) for introducing its product. If the terminal user selects a product name on the product advertising information screen 71*a* or a product name on the sales product information screen 71*b*, the sending/receiving unit 61 acquires a product introduction page corresponding to the selected product name from a site server of the manufacturer through the communication network 7, and displays it on the display unit 22. For example, upon selection of the product name "AAA milk", the sending/receiving unit 61 acquires a product instruction page corresponding to the product name "AAA milk" from the site server of the manufacturer through the communication network 7, and displays it on the display unit 22. On the basis of the setting of the user, if a product name is selected, it is possible to display a display screen having set specific information regarding, for example, the place of production, nutritional information, calorie, and sales conditions, in addition to the price of the sales product, the quantity of stock, and the rack position.

A special sales article button 72*c* is arranged on the shopping list display screen 70*j*. If the terminal user selects the special sales article button 72*c*, the display control unit 63 extracts information on articles for special sales from the sales product information stored in the storage unit 24, generates a special sales article display screen 71*c*, and displays it on the display unit 22. The "selling price" of an "article for special sales" is lower than that of the "normal price" in the sales product information. For example, in the sales product information illustrated in FIG. 5, the sales product "AAA milk" is extracted as the "article for special sales", because the selling price of the sales product "AAA milk" is "225 yen" which is lower than the normal price "255 yen".

The special sales article display screen 71*c* is a pop-up screen which is overlapped and displayed over the shopping list display screen 70*j*. In the example illustrated in FIG. 7, the sales product "AAA milk" is set as an article for special sales, and its corresponding manufacturer name, normal price, selling price, rack position, and quantity of stock are set. The layout of the special sales article display screen 71*c* is illustrated only by way of example, and can be changed on the basis of, for example, the setting of the terminal user.

A close button 72*f* is arranged also on the special sales article display screen 71*c*. If the terminal user selects the close button 72*f*, the special sales article display screen 71*c* can be closed. Further, the product name has an address (embedded therein) of the product introduction page. If the terminal user selects the product name "AAA milk", the sending/receiving unit 61 acquires the product introduction page corresponding to the product name "AAA milk" from the site server of the manufacturer through the communication network 7, and displays it on the display unit 22.

Accordingly, in the shopping application, the purchase planned product information is set in the shopping list. This enables to easily acquire specification information of the prices, stock condition, rack position, and manufacturer of products sold in the AP installation store, and to easily browse the pages of the manufacture. As a result, the terminal user can pleasantly and comfortably shop, thus remarkably improving the attractiveness of the AP installation store.

After the product advertising information screen 71a is displayed, the display control unit 63 displays the sales product information screen 71b, thus enabling to increase the advertisement effect of the products. When there is no operation made by the terminal user, the display control unit 63 can display, for example, the product advertising information screen 71a and the sales product information screen 71b, alternatively at predetermined periods. After the sales product information screen 71b is displayed, the display control unit 63 can display the product advertising information screen 71a. When the setting of the advertisement display is "OFF", the sales product information screen 71b is displayed on the display unit 22, without displaying the product advertising information screen 71a.

2.2. Wireless LAN Access Point 3

Descriptions will now be made to the wireless LAN access point 3. As illustrated in FIG. 2, the wireless LAN access point 3 has a wireless LAN unit 31, a control unit 32, a communication unit 33, and a storage unit 34. The wireless LAN unit 31 sends and receives information to and from the wireless terminal 2 having a wireless LAN communication function installed therein, and the communication unit 33 sends and receives information to and from the communication network 7.

The control unit 32 controls entirely the wireless LAN access point 3, and includes a relay unit 35 performing an information relay process and a detection unit 36 performing a detection process for the wireless terminal 2. The relay unit 35 sends, for example, information acquired from the wireless terminal 2 through the wireless LAN unit 31, from the communication unit 33 to the information providing apparatus 4, and sends information acquired from the information providing apparatus 4 through the communication unit 33, from the wireless LAN unit 31 to the wireless terminal 2.

Information transmission from the wireless LAN access point 3 to the information providing apparatus 4 is performed through packet communication, in which the address of the communication network 7 which is assigned to the wireless LAN access point 3 is regarded as a source address and the address of the communication network 7 which is assigned to the information providing apparatus 4 is regarded as a destination address. The address of the communication network 7 is assigned, for example, to the communication unit 33, and will hereinafter be referred to as an AP-ID.

Figure 8A:
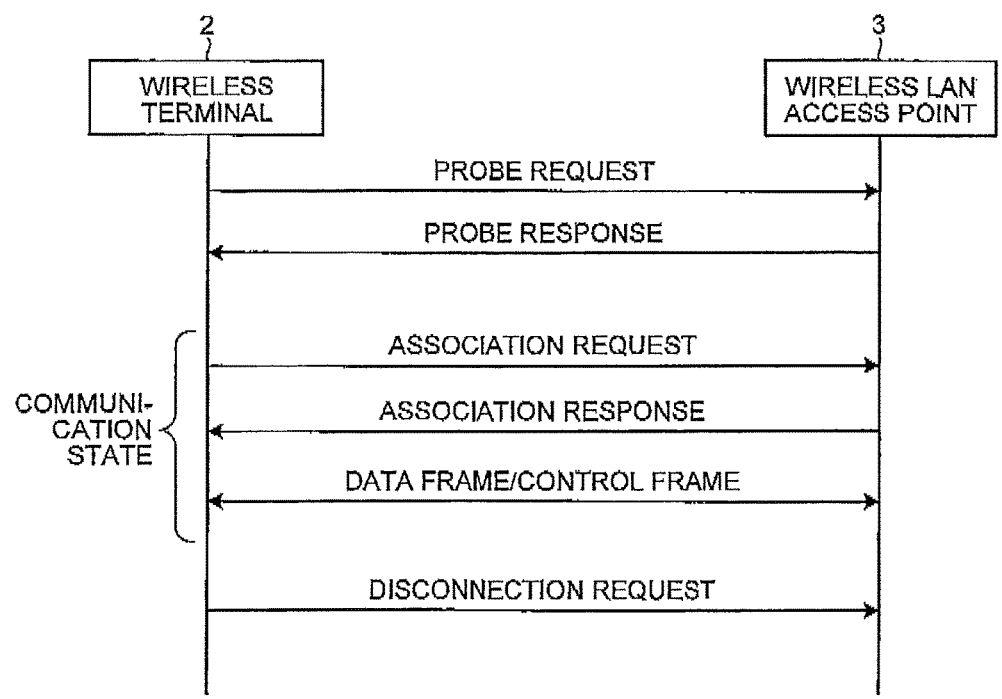
FIGS. 8A and 8B are diagrams illustrating sequences of session establishment between a wireless LAN access point and a wireless terminal.
Figure 8B:
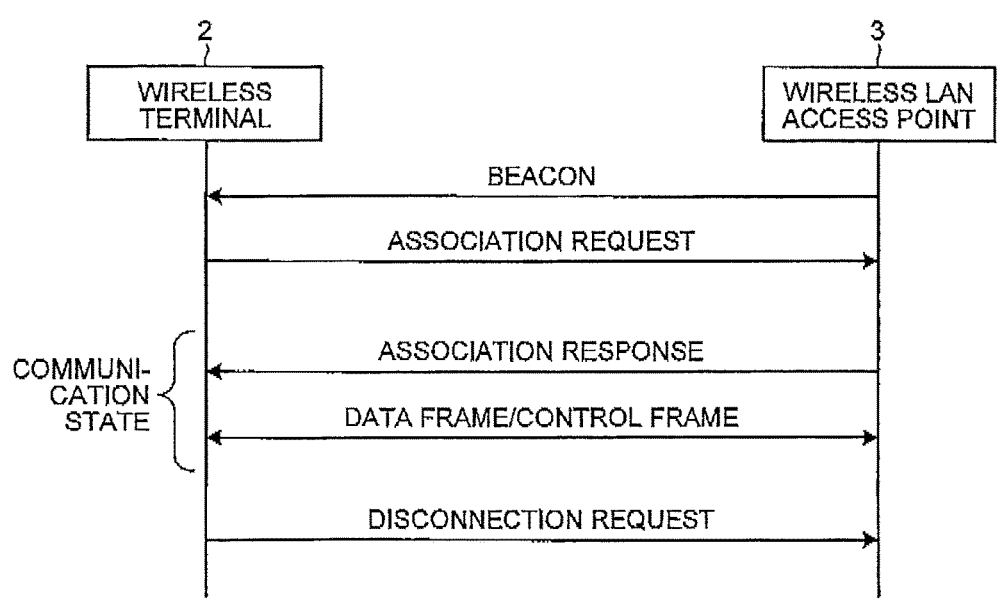

The detection unit 36 acquires a wireless packet(s) sent from the wireless terminal 2 through the wireless LAN unit 31, thereby detecting the existence of the wireless terminal 2. FIG. 8A and FIG. 8B are diagrams each showing a sequence of session establishment between the wireless LAN access point 3 and the wireless terminal 2.

In the example illustrated in FIG. 8A, a wireless packet (called a probe request) is periodically sent from the wireless terminal 2, by being broadcasted. The detection unit 36 acquires the wireless packets through the wireless LAN Unit 31, thereby detecting the existence of the wireless terminal 2.

The probe request includes a BSSID (Basic Service Set Identifier). The detection unit 36 sends a probe response to the wireless terminal 2, at coincidence with the BSSID of the wireless LAN unit 31. The wireless terminal 2 which has received the probe response is moved into a communication state, when the automatic communication is set.

As illustrated in FIG. 8A, the movement into the communication state is performed by establishing session, in response to an association request and an association response. After this, a data frame or a control frame is sent and received between the wireless terminal 2 and the wireless LAN unit 31, resulting in a communication state.

When a disconnection request is made from the wireless terminal 2, or when a wireless packet cannot be sent and received between the wireless terminal 2 and the wireless LAN unit 31, the communication state ends. At the movement into the communication state, the detection unit 36 repeatedly receives a wireless packet until the communication state ends, and is in a state of detecting the existence of the wireless terminal 2.

As illustrated in FIG. 8B, the detection unit 36 broadcasts a wireless packet (called a beacon) through the wireless LAN unit 31, for the wireless terminal 2 to which a wireless packet is not periodically sent. Upon reception of an association request corresponding to this beacon, the detection unit 36 detects the existence of the wireless terminal 2.

The detection unit 36 which has received the association request sends an association response to the wireless terminal 2, thereby establishing session to make a communication state between the wireless terminal 2 and the wireless LAN unit 31. When a disconnection request is sent from the wireless terminal 2, or when a wireless packet is not possibly sent/received between the wireless terminal 2 and the wireless LAN unit 31, the communication state ends. In the case of the example illustrated in FIG. 8A, after the detection unit 36 is moved into a communication state, it repeatedly receives a wireless packet until the communication state ends, and detects the existence of the wireless terminal 2.

Upon determination that, for example, the wireless terminal 2 has been detected, the detection unit 36 sends detection information to the information providing apparatus 4 through the communication unit 33. Specifically, the detection unit 36 extracts a terminal ID included in the wireless packet sent from the wireless terminal 2, and detects the radio field intensity of the wireless packet. The terminal ID is, for example, a MAC address of the wireless LAN unit 20 of the wireless terminal 2, added to the wireless packet, and sent from the wireless terminal 2.

The detection unit 36 regards information, as detection information, including identification information (hereinafter referred to as an AP-ID) of its wireless LAN unit 31, and sends it to the information providing apparatus 4, in addition to the terminal ID of the wireless terminal 2 and information on the radio field intensity. As an AP-ID, it is possible to use, for example, a network address of the communication network 7 which is assigned to the communication unit 33.

The detection unit 36 may count the staying time of the wireless terminal 2 in the AP communication area. In this case, the wireless terminal 2 can also send the staying time of the wireless terminal 2, which is included in the detection information, to the information providing apparatus 4.

2.3. Information Providing Apparatus 4

Descriptions will now be made to the information providing apparatus 4. As illustrated in FIG. 2, the information providing apparatus 4 includes a communication unit 41, a store information DB 42, an advertising information DB 43, and a control unit 44. Further, the control unit 44 has a store information providing unit 51, an advertising information providing unit 52, a settlement processing unit 53, and a program providing unit 54.

The communication unit 41 is an interface, for example, a NIC (Network Interface Card). The control unit 44 sends and receives various information items to and from the wireless LAN access point 3, the settlement server 5, and a store terminal 8, through the communication unit 41, and the communication network 7. The store information DB 42 and the advertising information DB 43 are storage devices, such as a semiconductor memory device and an optical disk, for example, a hard disk, a RAM, a flash memory. The store information DB 42 stores, for example, a store information table or a sales product information table.

The control unit 44 is realized with an integrated circuit, such as an ASIC or FPGA. The control unit 44 realizes functions as the store information providing unit 51, the advertising information providing unit 52, the settlement processing unit 53, and the program providing unit 54, upon execution of the RAM in accordance with the programs (including a content utilization management program) stored in the internal storage unit, as a working area, under the control of the CPU or MPU. The configuration of the control unit 44 is not limited to this configuration, and any other configuration may be possible as long as the information process, as will be described later, can be performed.

Store Information Providing Unit 51

In response to a check-in request from the wireless terminal 2 through the wireless LAN access point 3, the store information providing unit 51 acquires corresponding sales product information from the store information DB 42, and sends this sales product information to the wireless terminal 2 through the wireless LAN access point 3.

Specifically, the store information providing unit 51 specifies a store ID from the store information table, on the basis of the AP-ID of the wireless LAN access point 3 which has transferred the check-in request. Then, the store information providing unit 51 acquires, from the sales product information table, information on the sales products corresponding to the information on the purchase planned products included in the check-in request, of those products sold in the store corresponding to the specified store ID. The store information providing unit 51 sends the acquired information on the purchase planned products to the wireless terminal 2 through the wireless LAN access point 3.

The store information table and the sales product information table are information stored in the store information DB 42, and are set by the manager of the information providing apparatus 4. The sales product information corresponding to each store in the sales product information table can be set from the store terminal 8. The control unit 44 acquires a setting instruction as an instruction for adding, changing, or deleting the sales product information, from the store terminal 8 through the communication unit 41. Then, the control unit 44 adds, changes, or deletes the sales product information of the sales product information table in accordance with the setting instruction.

As illustrated in FIG. 9, the store information table has information items, for example, "store ID", "AP-ID", "store name", "store location", and "participating store ID", in association with each other. FIG. 9 is a diagram illustrating an example of a store information table.

The information item "store ID" is identification information of the installation place of the wireless LAN access point 3, and is assigned to each business space as the installation place. In this business space, two or more wireless LAN access points 3 can be installed, and it is possible to provide different sales product information items between the AP communication areas of the wireless LAN access point 3.

The "AP-ID" is identification information of the wireless LAN access point 3 installed in the store with the corresponding "store ID". For example, the example illustrated in FIG. 9 indicates that the wireless LAN access point 3 with the AP-ID "P1" is installed in the store with the store ID "R1". When a plurality of wireless LAN access points 3 are installed in the business space of the same store ID, a plurality of AP-IDs are assigned to one store ID.

The store information providing unit 51 specifies the store ID "R1" corresponding to the AP-ID "P1", on the basis of the store information table, when the store information table is in a state illustrated in FIG. 9, and when the wireless LAN access point 3 having transferred the check-in request has the AP-ID "P1".

The AP-ID is, for example, a source address of the check-in request. The store information providing unit 51 acquires the source address as an AP-ID. The method for acquiring the AP-ID is not limited to this. For example, the wireless LAN access point 3 may insert the AP-ID in the main data of the check-in request sent from the wireless terminal 2, instead of the information of the data header, and send it to the information providing apparatus 4. In this case, the store information providing unit 51 acquires the AP-ID from the main data of the check-in request.

As illustrated in FIG. 10, the sales product information table has information items, for example, "store ID", "target product", "product name", "manufacturer name", "normal price", "selling price", "stock state", and "rack position", in association with each other. FIG. 10 is a diagram illustrating an example of the sales product information table. Though not illustrated, the place of production of corresponding sales product, coupon information, and an address of the product introduction page are also set, in association with "product name".

The "target product" has set information of a general name of a product, for example, "milk" or "pasta". The "target product" is information on a purchase planned product included in the shopping list.

The "product name" is a specific name of individual products sold in a corresponding store, and is a name which is set by each manufacturer. For example, in the example illustrated in FIG. 10, "AAA milk", "BBB milk", and "CCC milk" are set.

The "normal price" is a normal price of each product in the store, while the "selling price" is a selling price of each product in the store. Any of those products whose "selling price" is lower than the "normal price" implies that the product is sold at a discount price, and is dealt as an article for special sale or a best bargain in the store.

The "stock state" represents the quantity of stock of the products in the store. When there is no stock, "0" is set in the "stock state". When a particular product has no stock, information on the scheduled arrival of the product is set. The "rack position" is set information representing the position of the rack where a corresponding product is displayed, of racks provided in the store.

When the sales product information table is in a state illustrated in FIG. 10, the store information providing unit 51 specifies that the store ID based on the check-in request is "R1". In this case, the store information providing unit 51 acquires sales product information set as a target product "milk" corresponding to the store ID "R1", from the sales product information table, if information on the purchase planned product included in the check-in request is, for example, only "milk".

The store information providing unit 51 acquires sales product information corresponding to the purchase planned product from the sales product information table, when the check-in request includes information regarding the setting date or setting date/time (hereinafter referred to as a setting date), only if this setting date is in a range before a predetermined limited period of time. For example, if information regarding the purchase planned product included in the check-in request is "milk", and if the setting date for "milk" is a date that is three or more days ago, the store information providing unit 51 acquires the sales product information corresponding to "milk". If not, the store information providing unit 51 does not acquire sales product information corresponding to "milk".

When a determination is made as to whether sales product information is acquired on the basis of the setting date of the purchase planned product, the store information providing unit 51 can set a predetermined period to be compared with the setting date, in association with each purchase planned product. For example, the product (a flavoring agent) that can be preserved long has a long predetermined period, while the product that cannot be preserved long has a short predetermined period.

Accordingly, after the sales product information is acquired from the sales product information table, the store information providing unit 51 creates a file, for example, "Z00004.text", as sales product information to be sent to the wireless terminal 2. The store information providing unit 51 creates sales product information to be sent to the wireless terminal 2, in association with each purchase planned product. When there are a plurality of information items regarding the purchase planned products included in the check-in request, it is possible to collect the information items extracted from the sales product information table into one file. In this case, the control unit 25 of the wireless terminal 2 extracts information items regarding each purchase planned product from one file, and sets the information items in the sales product information of the shopping list table.

The store information providing unit 51 analyzes the sales product information acquired from the sale product information table. When there is no stock of any of the sales products corresponding to the purchase planned products, the store information providing unit 51 acquires sales product information of another store that corresponds to the purchase planned products from the store information table, on the basis of a participating store ID set in the store information table (see FIG. 9), and sends the sales product information to the wireless terminal 2. As a result, even when there is no desired product in the store where the terminal user has entered, it is possible to inform the terminal user that there is stock of the product in another store.

For example, when the store information table is in a state illustrated in FIG. 9, and when the sales product information table is in a state illustrated in FIG. 10, a check-in request representing the purchase planned product information "pasta" is received by the information providing apparatus 4 through the wireless LAN access point 3 of the store ID "R1". In this case, the store information providing unit 51 determines that there is no stock of any of the sales products "AAA pasta" and "BBB pasta" set as a target product "pasta" corresponding to the store ID "R1", and acquires information of the target product "pasta" corresponding to the participating store ID "R2" corresponding to the store ID "R1" from the sales product information table.

There is stock of the sales products "AAA pasta" and "BBB pasta" set as the target product "pasta" corresponding to the participating store ID "R2". Thus, the store information providing unit 51 sends the sales product information set as the target product "pasta" corresponding to the participating store ID "R2", to the wireless terminal 2. The control unit 25 of the wireless terminal 2 can display, for example, the shopping list display screen 70j of FIG. 7 on the display unit 22. As a result, while staying in a store "A", the terminal user can know that the store "A" does not have "pasta" in stock, but a store "B" has "pasta" in stock. In this case, the sending/receiving unit 61 of the wireless terminal 2 can also set the price of the "pasta" in the shopping list display screen 70j.

When the check-in request is received from the wireless terminal 2, the store information providing unit 51 gives points (hereinafter referred to store visit points) to the wireless terminal 2. The store visit points are set in the terminal information table of the store information DB 42.

Figures 11, 12:
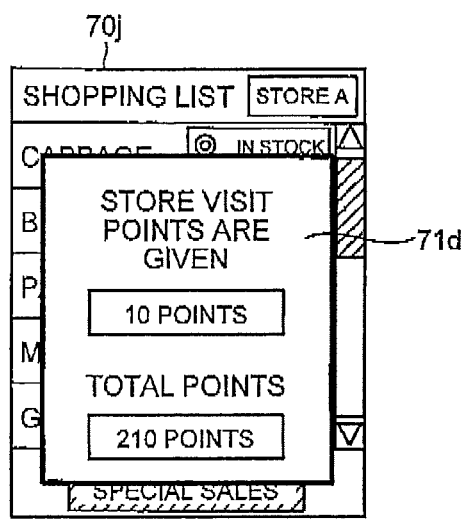
FIG. 11 is a diagram illustrating an example of a terminal information table.
FIG. 12 is a diagram illustrating an example of a point giving screen.

As illustrated in FIG. 11, for example, the terminal information table includes information items "store ID", "terminal ID", "points", "staying time", and "radio field intensity", in association with each other. FIG. 11 is a diagram illustrating an example of a terminal information table.

The "terminal ID" is, for example, a MAC address of the wireless LAN unit 20 of the wireless terminal 2. The "points" are points given to each wireless terminal 2, in association with each store. The "staying time" is a staying time of the wireless terminal 2 in a corresponding store, and the "radio field intensity" is a radio field intensity of a wireless packet sent by the wireless terminal 2. The "terminal ID", the "staying time", and the "radio field intensity" are set in the terminal information table by the control unit 44, on the basis of, for example, detection information sent from the wireless LAN access point 3.

The "staying time" is an elapsed time since the wireless terminal 2 checks in the store. The "radio field intensity" represents the latest radio field intensity included in the detection information, but may also be an average radio field intensity since the wireless terminal 2 checks in the store. In this case, the information items "staying time" and the "radio field intensity" are calculated by the control unit 44 on the basis of the detection information and set in the terminal information table.

Upon reception of the check-in request from the wireless terminal 2, the store information providing unit 51 adds preset store visit points to the "points" corresponding to the terminal ID of the wireless terminal 2 which has sent the check-in request, in the terminal information table. The store information providing unit 51 sends point information (including both the store visit points and the total points) to the wireless terminal 2 through the wireless LAN access point 3.

The display control unit 63 of the wireless terminal 2 generates a point giving screen on the basis of the point information acquired from the information providing apparatus 4, and displays it on the display unit 22. FIG. 12 is a diagram illustrating an example of the point giving screen.

On the point giving screen 71d illustrated in FIG. 12, the store visit points are 10 points, and the total points are 210 points.

As described above, the store information providing unit 51 sets the "staying time" and the "radio field intensity" based on the detection information sent from the wireless LAN access point 3, in the terminal information table. The store information providing unit 51 can set the timing to acquire sales product information from the sales product information table, on the basis of the "staying time" and the "radio field intensity" set in the terminal information table.

For example, even if a check-in request is sent, the store information providing unit 51 can be set not to acquire the sales product information from the sales product information table, when the staying time of the wireless terminal 2 is equal to or less than a predetermined period of time (hereinafter referred to as a staying time threshold value), or when the radio field intensity is equal to or lower than a predetermined threshold value (hereinafter referred to as a radio field intensity threshold value). By this setting, the terminal user can securely be in a store visit state in the AP installation store, thus improving the sales opportunity of the store side.

In this case, the sending/receiving unit 61 of the wireless terminal 2 sends a check-in request to the information providing apparatus 4 periodically (for example, every 10 seconds), until the sales product information is sent from the information providing apparatus 4 in response to a check-in request.

The store information providing unit 51 can set a sending condition in the unit of sales product information. For example, it is possible to set a longer staying time threshold value and larger radio field intensity threshold value, both corresponding to sales product information with a super discount price, than those corresponding to any other sales product information items. As a result, it is possible to cause the terminal user to enter and stay long in the AP installation store and to come around the wireless LAN access point 3.

Instead of a process by the store information providing unit 51, a process by the control unit 25 of the wireless terminal 2 may be performed for changing the timing to send the sales product information. For example, the control unit 25 of the wireless terminal 2 detects the radio field intensity or the staying time based on the communication state of the wireless LAN Unit 20. When the staying time exceeds a predetermined period of time, or when the radio field intensity exceeds a predetermined threshold value, the control unit 25 may send the check-in request to the information providing apparatus 4 through the wireless LAN access point 3. The control unit 25 of the wireless terminal 2 may set the condition of the timing to send the check-in request, in association with each unit of purchase planned product.

Advertising Information Providing Unit 52

Descriptions will now be made to the advertising information providing unit 52. The advertising information providing unit 52 searches the advertising information DB 43 for product advertising information, using information on the purchase planned product included in the check-in request, as a search keyword.

The advertising information DB 43 stores information including each search keyword and one or more product advertising information items, in association with each other. The advertising information DB 43 outputs one or more advertising information items corresponding to a search keyword to the advertising information providing unit 52, using information on the purchase planned product input from the advertising information providing unit 52 as the search keyword. The advertising information providing unit 52 sends the advertising information acquired from the advertising information DB 43 to the wireless terminal 2 through the wireless LAN access point 3, as product advertising information.

For example, in the advertising information DB 43, an advertising information item of AAA milk, an advertising information item of BBB milk, and an advertising information item of CCC milk are stored in association with a search keyword "milk". In this case, the advertising information providing unit 52 sends the advertising information items of AAA milk, BBB milk, and CCC milk to the wireless terminal 2 as product advertising information, using a keyword "milk".

The advertising information providing unit 52 can also send, to the wireless terminal 2, only a product advertising information item which coincides with the product(s) included in the sales product information acquired by the store information providing unit 51 in response to the check-in request from the wireless terminal 2, of the acquired product advertising information items. As a result, the wireless terminal 2 does not display any product advertisement which has nothing to do with those products sold in the AP installation store. Therefore, it is possible to reduce an amount of sales product information, and to facilitate efficient advertisement.

The advertising information providing unit 52 may acquire product advertising information corresponding to the search keyword, from an external advertisement server, using information on the purchase planned product as a search keyword. In this case, the information providing apparatus 4 does not necessarily include the advertising information DB 43.

Settlement Processing Unit 53

Descriptions will now be made to the settlement processing unit 53. The settlement processing unit 53 acquires purchase information representing that the terminal user having received the sales product information or product advertising information has purchased a sales product corresponding to the sales product information or product advertising information in the installation store of the wireless LAN access point 3. For example, when the terminal user has purchased the product sold in the AP installation store, the store terminal 8 can send purchase information including the price of the purchased product and the terminal ID to the information providing apparatus 4. Then, the settlement processing unit 53 acquires this purchase information.

In the shopping application, it is possible to input information on an ingredient(s) purchased in the AP installation store and included in the ingredients in the shopping list. The sending/receiving unit 61 of the wireless terminal 2 sends purchase information including ingredient information (including the purchase price of the ingredient) regarding the ingredient purchased by the terminal user and the terminal ID, through the wireless LAN access point 3.

When unique information is stored in association with the terminal ID in the information providing apparatus 4, the settlement processing unit 53 can acquire information (including price information) regarding the purchased product, as sent together with the unique information. For example, the settlement processing unit 53 can acquire a credit card number and the purchased product, as purchase information, from a device of a credit card company.

Further, when the purchase information is acquired, the settlement processing unit 53 performs a settlement process by sending a request for the settlement process to the settlement server 5. In this case, a part of the price received by the installation store of the wireless LAN access point 3 from the terminal user is regarded as a price (hereinafter referred to as a service charge) received by the information providing service agent of the information providing apparatus 4.

The price which is received by the installation store of the wireless LAN access point 3 from the terminal user is the purchase price of the product that the terminal user has purchased in the AP installation store. The settlement processing unit 53 calculates 3% of the purchase price of the product purchased by the terminal user as a service charge, and requests the settlement server 5 for settlement.

Program Providing Unit 54

Descriptions will now be made to the program providing unit 54. The program providing unit 54 has program data of the shopping application, and sends the program data of the shopping application to the wireless terminal 2 as the request source through the communication network 7, in response to a request for sending the program from the wireless terminal 2.

The program data of the shopping application may also be sent from a program sending server which differs from the information providing apparatus 4. The program data of the shopping application includes a recipe information table, but does not necessarily include the recipe information table. In this case, the sending/receiving unit 61 of the wireless terminal 2 requests a server (not illustrated) having the recipe information table for information on the recipe information table, acquires it therefrom, and stores the information in the storage unit 24.

3. Process Flow of Information Providing System 1

Descriptions will now be made to a procedure of an information providing process by the information providing system 1 according to this embodiment. FIG. 13 to FIG. 16 are diagrams each for explaining an information providing process flow by the information providing system 1. In the descriptions below, descriptions will be made to a process of the wireless terminal 2 with reference to FIG. 13, descriptions will be made to a process of the wireless LAN access point 3 with reference to FIG. 14, and descriptions will be made to a process of the information providing apparatus 4 with reference to FIG. 15 and FIG. 16.

Process of Wireless Terminal 2

Figure 13:
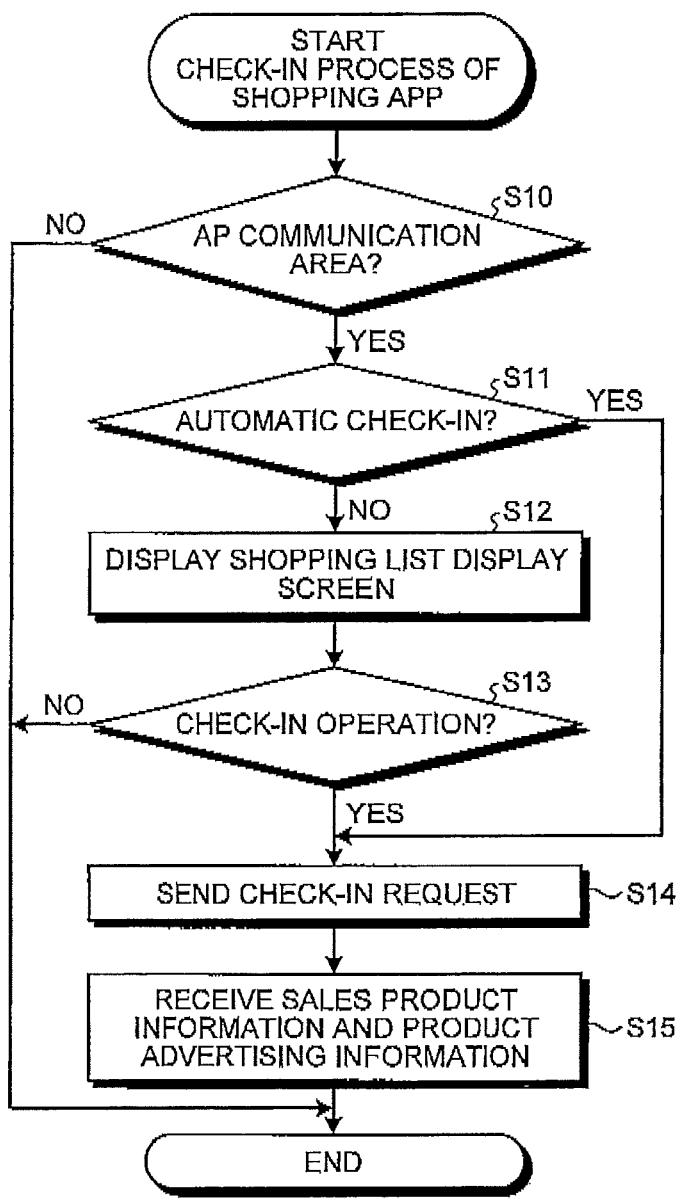
FIG. 13 is a flowchart of a check-in process by the shopping application.

Descriptions will now be made to a process of the shopping application of the wireless terminal 2. Because specific descriptions have already been made to the controlling of the display, descriptions will now be made to a check-in process of processes of the shopping application. FIG. 13 is a flowchart of a check-in process by the shopping application. This check-in process is a process which is repeatedly performed by the control unit 25 operating the shopping application.

As illustrated in FIG. 13, the control unit 25 of the wireless terminal 2 determines whether the wireless terminal 2 has entered an AP communication area (step S10). The control unit 25 determines that the wireless terminal 2 has entered the AP communication area, when communication session is established with the wireless LAN access point 3, and when being moved into a communication state.

When it is determined that the wireless terminal 2 has entered the AP communication area (step S10; Yes), the control unit 25 determines whether a check-in function is set to be automatic (step S11). When the check-in function is set to be automatic (step S11; Yes), the control unit 25 moves to step S14 in the process. When the check-in function is not set to be automatic" (step S11; No), the control unit 25 generates a shopping list display screen, and displays it on the display unit 22 (step S12).

The control unit 25 determines whether the terminal user has performed a check-in operation on the shopping list display screen (step S13). The control unit 25 determines that the check-in operation has been performed, in a state where the shopping list display screen 70i illustrated in FIG. 7 is displayed, and when the check-in button 72b is operated by the terminal user.

When it is determined that the check-in operation has been performed in a predetermined period of time (step S13; Yes), the control unit 25 moves to step S14 in the process. When it is determined that the check-in operation has not been performed in a predetermined period of time (step S13; No), the control unit 25 displays the main selection screen 70a in place of the shopping list display screen on the display unit 22, and ends the check-in process.

In step S14, the control unit 25 sends the check-in request to the information providing apparatus 4 through the wireless LAN access point 3 (step S14). This check-in request includes purchase planned product information included in the shopping list or a terminal ID, as described above.

The control unit 25 acquires sales product information or product advertising information sent from the information providing apparatus 4 through the wireless LAN access point 3, in response to the sent check-in request, and stores them in the storage unit 24 (step S15). Then, the control unit 25 ends the check-in process. The control unit 25 ends the check-in process, also when it is determined that the wireless terminal 2 has not entered the AP communication area in step S10 (step S10; No).

Process of Wireless LAN Access Point 3

Figure 14:
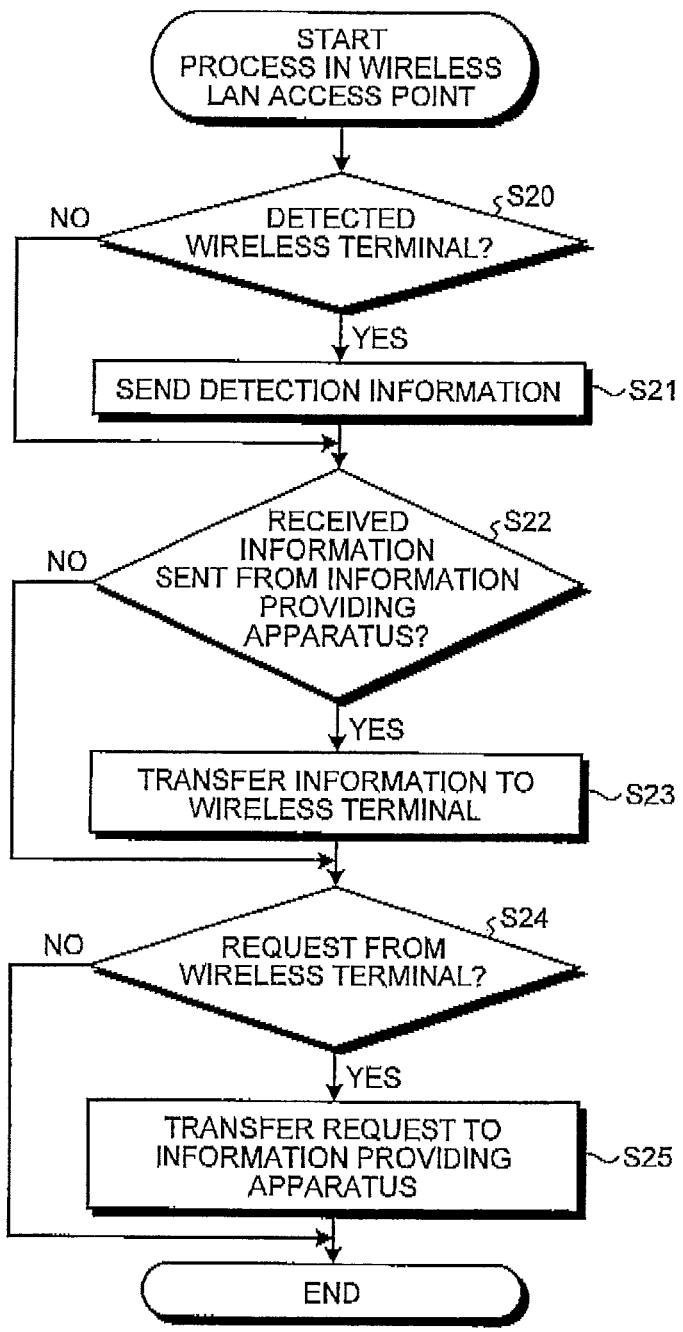
FIG. 14 is a flowchart of an information process at a wireless LAN access point.

Descriptions will now be made to an information process of the wireless LAN access point 3 according to the embodiment, with reference to FIG. 14. FIG. 14 is a flowchart of the information process in the wireless LAN access point 3. This operation is a process which is repeatedly executed by the control unit 32 of the wireless LAN access point 3.

As illustrated in FIG. 14, the control unit 32 of the wireless LAN access point 3 determines whether the wireless terminal 2 has been detected (step S20). In this process, when it is determined that the wireless terminal 2 has been detected (step S20; Yes), the control unit 32 sends detection information to the information providing apparatus 4 through the communication unit 33 (step S21).

In the procedure of step S20, when it is determined that the wireless terminal 2 has not been detected (step S20; No), or when the procedure of step S21 has ended, the control unit 32 determines whether information has been received from the information providing apparatus 4 through the communication unit 33 (step S22). When it is determined that information has been received from the information providing apparatus 4 (step S22; Yes), the control unit 32 transfers the information received from the information providing apparatus 4 to the wireless terminal 2 as the destination of the information (step S23).

In step S22, when it is determined that information has not been received from the information providing apparatus 4 (step S22; No), or when the procedure of step S23 has ended, the control unit 32 determines whether a request is sent from the wireless terminal 2 to the information providing apparatus 4 (step S24). When it is determined that a request is sent from the wireless terminal 2 to the information providing apparatus 4 (step S24; Yes), the control unit 32 transfers the request from the wireless terminal 2 to the information providing apparatus 4 through the communication unit 33 (step S25).

When the procedure of step S25 has ended, or when it is determined that no request is sent from the wireless terminal 2 to the information providing apparatus 4 in step S24 (step S24; No), the control unit 32 ends the process. The control unit 32 can execute the procedures of steps S20 and S21, procedures of steps S22 and S23, and procedures of steps S24 and S25, using multitasking processes.

Process of Information Providing Apparatus 4

Figure 15:
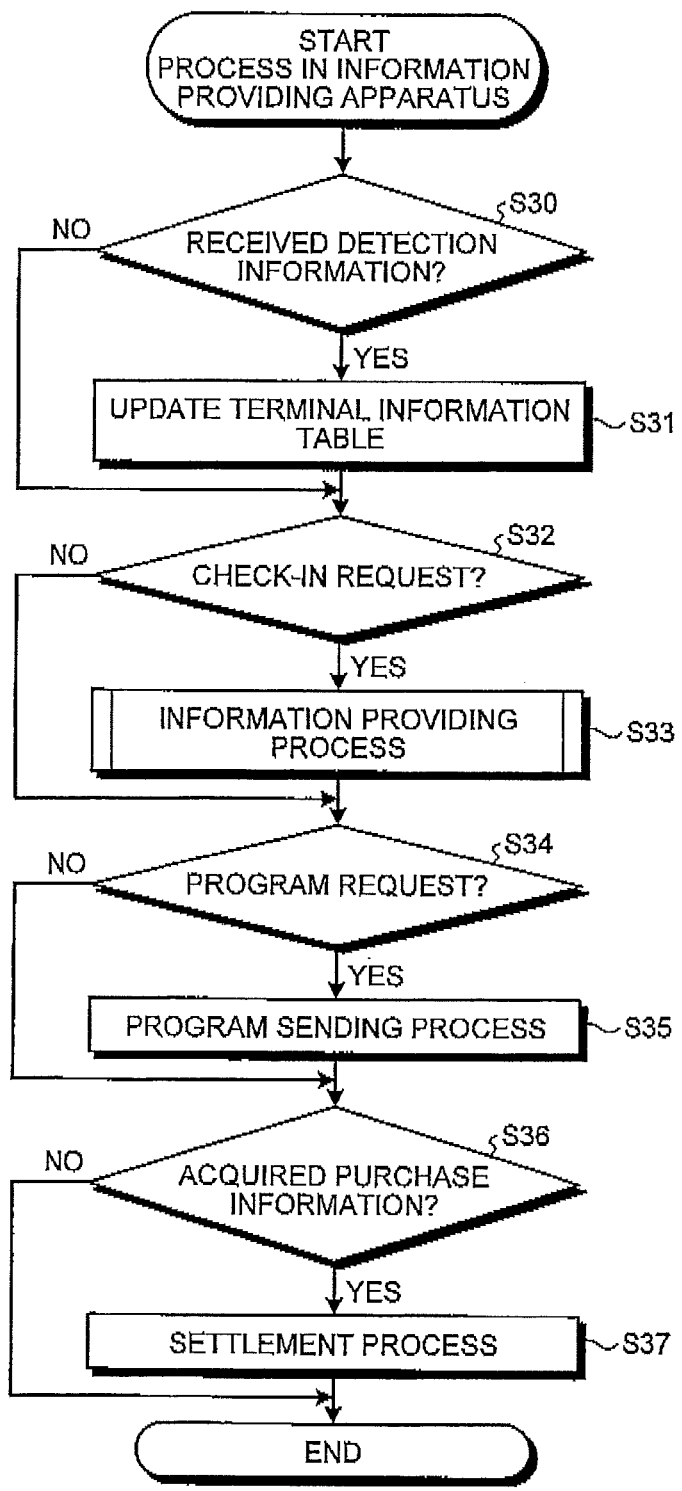
FIG. 15 is a flowchart of an information process in an information providing apparatus.

Descriptions will now be made to a process of the information providing apparatus 4. FIG. 15 is a flowchart of an information process in the information providing apparatus 4. This operation is repeatedly performed by the control unit 44 of the information providing apparatus 4.

As illustrated in FIG. 15, the control unit 44 determines whether detection information has been received from the wireless LAN access point 3 through the communication unit 41 (step S30). When the detection information has been received (step S30; Yes), the control unit 44 updates the terminal information table based on the received detection information (step S31).

In step 930, when the detection information has not been received (step S30; No), or when the procedure of step S31 has ended, the control unit 44 determines whether a check-in request has been received from the wireless terminal 2 through the communication unit 41 (step S32). When the check-in request has been received (step S32; Yes), the control unit 44 executes an information providing process (step S33). This information providing process is a process performed from step S40 to step S42 of FIG. 16, and thus will specifically be described later.

In step S32, when the information providing request has not been received (step S32; No), or when the procedure of step S33 has ended, the control unit 44 determines whether a program request has been received from the wireless terminal 2 through the communication unit 41 (step S34). When the program request has been received from the wireless terminal 2 (step S34; Yes), the control unit 44 sends program data of the shopping application to the wireless terminal 2 (step S35).

In step S34, when the program request has not been received from the wireless terminal 2 (step S34; No), or when the procedure of step S35 has ended, the control unit 44 determines whether purchase information has been acquired from the wireless terminal 2 through the communication unit 41 (step S36). When the purchase information has been received (step S36; Yes), the control unit 44 performs a settlement process, in which a part of a sum of money for the product purchased by the terminal user is regarded as a service charge received by the information providing service agent (step S37).

When the procedure of step S37 has ended, or when the program request has not been received in step S36 (step S36; No), the control unit 44 ends the process.

Figure 16:
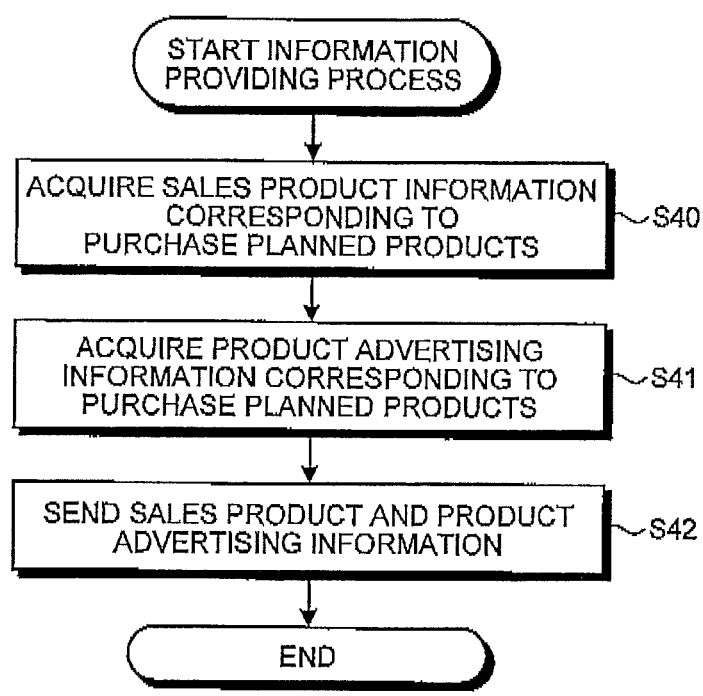
FIG. 16 is a flowchart of an information providing process in an information providing apparatus.

Descriptions will now be made to an information providing process illustrated in step S33 of FIG. 15. FIG. 16 is a flowchart of the information providing process in the information providing apparatus 4.

As illustrated in FIG. 16, in the information providing process, the control unit 44 acquires sales product information of the purchase planned product included in the check-in request, from the store information DB 42 (step S40). The control unit 44 acquires product advertising information of the purchase planned product included in the check-in request from the advertising information DB 43 (step S41).

The control unit 44 sends the sales product information acquired from the store information DB 42 and the product advertising information acquired from the advertising information DB 43, to the wireless terminal 2 having sent the check-in request through the wireless LAN access point 3 (step S42), and ends the information providing process.

4. Modification

In the above-described embodiment, the control unit 44 of the information providing apparatus 4 acquires the sales product information or product advertising information, when the check-in request is sent from the wireless terminal 2. However, the timing to acquire the sales product information or product advertising information is not limited to the timing at which the check-in request has been sent. For example, the sending/receiving unit 61 of the wireless terminal 2 may send information on a selected purchase planned product to the information providing apparatus 4, every time the terminal user selects a purchase planned product, while the control unit 44 of the information providing apparatus 4 may send sales product information or sales advertising information corresponding to the purchase planned product to the wireless terminal 2, every time information on the purchase planned product is received.

In the above embodiment, it is possible to check in, when the user enters the AP installation store, in a state where the shopping application is operated. However, an activation instruction for activating the shopping application may be sent from the wireless LAN access point 3 to the wireless terminal 2. In this case, upon reception of the activation instruction, the control unit 25 of the wireless terminal 2 operates the shopping application, and sends the check-in request to the information providing apparatus 4 through the wireless LAN access point 3.

When the wireless terminal 2 has a GPS (Global Positioning System) reception function, the control unit 25 of the wireless terminal 2 can acquire information regarding the current location (latitude and longitude) of the wireless-terminal 2. The control unit 25 of this wireless terminal 2 can perform a process for generating a shopping list display screen on which purchase planned product information closer to the rack position is arranged on a higher position in the shopping list, as long as latitude and longitude information is included, for example, in the information on the rack position.

When all of the purchase planned products set in the shopping list are available in the AP installation store, the display control unit 63 of the wireless terminal 2 can display information representing this availability on the display unit 22, calculate the range of the total price, and display this calculation result on the display unit 22.

After the sales product information or product advertising information are stored in the storage unit 24, if the wireless terminal 2 gets out from the AP installation store, the information management unit 62 of the wireless terminal 2 deletes sales product information or product advertising information stored in the storage unit 24. This enables to suppress the memory capacity to be used.

Even when the terminal user gets out from the AP installation store, the sales product information or product advertising information stored in the storage unit 24 may be kept until a predetermined period of time (for example, one day) has elapsed, and these information items may be deleted after the predetermined period of time has elapsed. As a result, when the wireless terminal 2 moves from the store A to the store B, the display control unit 63 can compare and display sales product information items corresponding to the store A and the store B. This facilitates the terminal user to purchase the product in a store that gives a higher discount rate.

5. Effect

The information providing system 1 according to the embodiment has the wireless terminal 2, the wireless LAN access point 3 (an example of a wireless LAN communication apparatus), and the information providing apparatus 4. In the wireless terminal 2, the storage unit 24 (an example of a storage unit) stores a shopping list including information on a plurality of purchase planned products, the sending/receiving unit 61 (an example of a sending unit) sends information on the purchase planned products included in the shopping list, the sending/receiving unit 61 (an example of a receiving unit) receives information on sales products corresponding to the purchase planned products, and the display control unit 63 displays the information on the sales products received by the sending/receiving unit 61 on the display unit 22 (an example of a display unit). In the wireless LAN access point 3, the detection unit 36 (an example of a detection unit) detects any wireless terminal 2 existing in the installation store of the wireless LAN access point 3, and the relay unit 35 (an example of a relay unit) transfers information on the purchase planned products sent from the wireless terminal 2 detected by the detection unit 36 to the information providing apparatus 4, acquires information on sales products corresponding to the purchase planned products from the information providing apparatus 4, and transfers the acquired information to the wireless terminal 2. In the information providing apparatus 4, the store information providing unit 51 or the advertising information providing unit 52 (examples of a terminal information acquiring unit, a store information acquiring unit, and a sending unit) acquires information on the purchase planned products sent from the wireless terminal 2 existing in the installation-store of the wireless LAN access point 3, from the wireless LAN access point 3, acquires information on the sales products corresponding to the information on the purchase planned products, and sends the acquired sales product information to the wireless LAN access point 3.

According to this configuration, the display unit 22 of the wireless terminal 2 displays information on products sold in the AP installation store in accordance with the set state of the shopping list. Therefore, the purchase planned products are set in the shopping list. Then, the user of the wireless terminal 2 having entered the AP installation store can easily know information on desired products, of those products sold in the AP installation store. As a result, the user can comfortably shop in the AP installation store. The AP installation store can appeal a product that the store wishes to sell to the customer who is in the actual store in real time, and can increase the sales.

In the information providing apparatus 4, the store information DB 42 (an example of a store information storage unit) stores, as information on the sales product, at least one information piece, of the price, the stock condition, the rack position, the place of production, and the manufacturer information of the sales products in a corresponding installation store, in association with each installation store of the wireless LAN access point 3. Further, the store information providing unit 51 acquires information on the sales product corresponding to information on the purchase planned products from the store information DB 42.

According to this configuration, the display unit 22 of the wireless terminal 2 can display information on the products sold in the AP installation store, in association with each installation store of the wireless LAN access point 3.

The store information providing unit 51 acquires information on products sold in a store different from the installation store of the wireless LAN access point 3 having sent the information on the purchase planned products, from the store information DB 42 as information on sales products corresponding to the purchase planned products.

According to this configuration, the user of the wireless terminal 2 can acquire information on the sales products in a store different from the store that the user enters and stays, and thus remarkably increasing the attractiveness of the AP installation store. It is possible to display information on only those products not in stock in the store that the user enters and stays, in association with any other stores. This enables that the stores have cooperation with each other, thus promoting the sales of the products in the stores.

The store information providing unit 51 acquires the advertising information which has been searched using information on the purchase planned products as a keyword, from the advertising information DB 43, as information on the sales products corresponding to the information on the purchase planned products.

According to this configuration, the display unit 22 of the wireless terminal 2 displays advertising information of the products in accordance with the set condition of the shopping list. Thus, the terminal user is not required to search the information on the products that are frequently and recently advertised, using a keyword. As a result, the terminal user can comfortably shop in the AP installation store.

In the information providing apparatus 4, the settlement processing unit 53 acquires purchase information representing that the user of the wireless terminal 2 (received the information on the sales products) has purchased the sales products in the installation store of the wireless LAN access point 3. When this purchase information has been acquired, a settlement process is performed. In this case, a part of the price received by the installation store of the wireless LAN access point 3 from the terminal user is regarded as a price received by the information providing service agent of the information providing apparatus 4.

According to this configuration, the information providing service agent of the information providing apparatus 4 can receive the price for the provided service. This enables to configure a system that provides benefits to three parties that are the AP installation store, the terminal user, and the information providing service agent.

The detection unit 36 of the wireless LAN access point 3 detects the radio field intensity and/or the staying time of the wireless terminal 2 in the installation store of the wireless LAN access point 3, and sends information on the detection result to the information providing apparatus 4. The store information providing unit 51 of the information providing apparatus 4 acquires information on the sales products corresponding to the information on the purchase planned products, on the basis of the radio field intensity and/or the staying time of the wireless terminal 2.

According to this configuration, when the staying time of the wireless terminal 2 is equal to or less than a predetermined period of time, or when the radio field intensity is equal to or less than a predetermined threshold value, the sales product information is set not to be acquired. By this setting, the terminal user can securely be in a store visit state in the AP installation store, resulting in improving the sales opportunity of the store side.

The information on the purchase planned products includes information on date or date/time set in the shopping list. When the setting date or setting date/time included in the information on the purchase planned products is in a range before a predetermined period of time, the store information providing unit 51 acquires information on the sales products corresponding to the information on the purchase planned products.

According to this configuration, it is possible to avoid that the terminal user unintentionally purchases an unnecessary product, which might be one of the previous purchase planned products, for example.

6. Others

The above-described information providing apparatus 4 may be realized by a plurality of server computers, and may have a configuration which can flexibly be changed. For example, for some function, an external platform may be called and realized through an API (Application Programming Interface) or network computing. The information providing apparatus 4 and the settlement server 5 may be realized by one server computer.

According to an aspect of the present embodiment, there is provided an information providing system, an information providing apparatus, a shopping program, and an information providing method, that can provide sales product information of a store in accordance with a shopping list.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information providing system comprising:
   a wireless terminal comprising:
      a first memory;
      a display;
      a wireless Local Area Network (LAN) interface; and
      a first processor programmed to:
         display, on the display, an editable shopping list including at least one ingredient that is planned to be purchased;
         store, in the first memory, the editable shopping list;
         transmit, via the wireless LAN interface, a probe or beacon request; and
         after the wireless terminal enters a physical store area and receives check-in information from a wireless LAN access point apparatus, which is physically installed in the physical store area, that received the probe or beacon request:
            (1) transmit, via the wireless LAN interface to the wireless LAN access point apparatus that received the probe or beacon request, an ingredient request that includes the at least one ingredient that is planned to be purchased;
            (2) receive, from the wireless LAN access point apparatus, at least one of a price and stock state of one or more products corresponding to the at least one ingredient that is planned to be purchased;
            (3) store the received at least one of the price and stock state in the first memory; and
            (4) upon receipt of a user input selection of the at least one of ingredient that is planned to be purchased display, on the display, the at least one of the price and stock state of the one or more products corresponding to the at least one ingredient that is planned to be purchased;
   the wireless LAN access point apparatus that is physically installed in the physical store area, the wireless LAN access point apparatus comprising:
      a second processor programmed to:
         upon reception of the probe or beacon request: (1) extract a terminal ID included in the probe or beacon request, and (2) transmit check-in information to the wireless terminal;
         upon reception of the ingredient request: (1) determine that existence of the wireless terminal in the physical store area in which the wireless LAN access point apparatus is installed has been detected, (2) extract the at least one ingredient that is planned to be purchased from the ingredient request, and (3) transmit, to a product database apparatus, the extracted terminal ID, the at least one ingredient that is planned to be purchased, and at least one of a detected radio field intensity and a staying time of the wireless terminal; and
         upon reception, from the product database apparatus, of the at least one of the price and stock state of the one or more products corresponding to the at least one ingredient that is planned to be purchased, transmit, to the wireless terminal, the at least one of the price and stock state of the one or more products corresponding to the at least one ingredient that is planned to be purchased; and
   the product database apparatus comprising:
      a second memory that stores information on products available in the physical store including at least one of prices and stock states of the products in the physical store;
      a network interface; and
      a third processor programmed to:
         upon reception of the ingredient request from the wireless LAN access point apparatus, and in the case that at least one of: the staying time of the wireless terminal extracted from the ingredient request is greater than a predetermined period of time, and the radio field intensity of the wireless terminal extracted from the ingredient request is greater than a predetermined threshold value:
            (1) identify, from among the stored information on the products available in the physical store, at least one of the price and stock state of one or more products corresponding to the at least one ingredient that is planned to be purchased; and
            (2) transmit the identified at least one of the price and stock state to the wireless LAN access point apparatus via the network interface.

2. The information providing system according to claim 1, wherein:
   the third processor is further programmed to transmit at least one of display positions, place of production, and manufacturer of the respective products, upon reception of the ingredient request.

3. The information providing system according to claim 1, wherein
   the third processor is further programmed to acquire information on products corresponding to the ingredients that are planned to be purchased that are products sold in a store that is different from the physical store in which the wireless LAN access point apparatus is installed.

4. The information providing system according to claim 1, wherein
the third processor is further programmed to acquire advertising information which is searched by using the ingredients that are planned to be purchased as a search keyword, and transmitting the acquired advertising information to the wireless LAN access point apparatus.

5. The information providing system according to claim 1, wherein the third processor is further programmed to:
acquire purchase information representing that a user of the wireless terminal has purchased one of the one or more products corresponding to the ingredient that is planned to be purchased; and
when the purchase information is acquired, perform a settlement process, in which a part of a price received by the physical store from the user of the wireless terminal is regarded as a price which is received by a service provider of the product database apparatus.

6. The information providing system according to claim 1, wherein:
the third processor is further programmed to acquire information on the one or more products corresponding to the at least one ingredient that is planned to be purchased, when the date/time in which the at least one ingredient was set in the ingredient list is within a predetermined limited time range.

7. The information providing system according to claim 1, wherein the at least one of the price and the stock state is the stock state, and the stock state is the individual quantity of available product items within the physical store of the respective product corresponding to the at least one ingredient that is planned to be purchased.

8. The information providing system according to claim 1, wherein the third processor is further programmed to set at least one of individual predetermined staying time thresholds and individual predetermined radio field intensity threshold conditions for each product on sale that is available in the physical store.

9. A method comprising:
upon reception of a probe or beacon request, by a wireless Local Area Network (LAN) apparatus: (1) extracting a terminal ID included in the probe or beacon request, and (2) transmitting check-in information to the wireless terminal that transmitted the probe or beacon request;
upon reception, by the wireless Local Area Network (LAN) apparatus, of an ingredient request that includes at least one ingredient that is planned to be purchased: (1) determining that existence of the wireless terminal in a physical store area in which the wireless LAN access point apparatus is installed has been detected, (2) extracting the at least one ingredient that is planned to be purchased from the ingredient request, and (3) transmitting, to a product database apparatus, the extracted terminal ID, the at least one ingredient that is planned to be purchased, and at least one of a detected radio field intensity and a staying time of the wireless terminal; and
upon reception, by the wireless Local Area Network (LAN) apparatus from the product database apparatus, of the at least one of the price and stock state of the one or more products corresponding to the at least one ingredient that is planned to be purchased, transmit, to the wireless terminal, the at least one of the price and stock state of the one or more products corresponding to the at least one ingredient that is planned to be purchased;
upon reception of the ingredient request, by the product database apparatus from the wireless LAN access point apparatus, and in the case that at least one of: the staying time of the wireless terminal extracted from the ingredient request is greater than a predetermined period of time, and the radio field intensity of the wireless terminal extracted from the ingredient request is greater than a predetermined threshold value:
(1) identifying at least one of the price and stock state of one or more products corresponding to the at least one ingredient that is planned to be purchased, from a memory that stores pieces of information on products that are available in the physical store; and
(2) transmitting the identified at least one of the price and stock state to the wireless LAN access point apparatus;
upon reception, by the wireless LAN access point apparatus from the product database apparatus, of the identified at least one of the price and stock state of the one or more products corresponding to the ingredient that is planned to be purchased, transmitting, to the wireless terminal, the at least one of the price and stock state of the one or more products corresponding to the at least one ingredient that is planned to be purchased;
receiving, by the wireless terminal from the wireless LAN access point apparatus, the identified the at least one of the price and stock state of the one or more products corresponding to the at least one ingredient that is planned to be purchased;
storing, by the wireless terminal in a memory of the wireless terminal, the received the at least one of the price and stock state of the one or more products corresponding to the at least one ingredient that is planned to be purchased; and
upon receipt, by the wireless terminal, of a user input selection of one of the at least one ingredient that is planned to be purchased, display, on a display of the wireless terminal, the at least one of price and stock state of the product corresponding to the selected ingredient.

* * * * *